United States Patent [19]
Nakae et al.

[11] Patent Number: 5,916,130
[45] Date of Patent: Jun. 29, 1999

[54] APPARATUS FOR DETECTING ABNORMALITY IN INTERNAL COMBUSTION ENGINE-RELATED DEVICE AND POWER OUTPUT SYSTEM WITH SUCH APPARATUS

[75] Inventors: Koichi Nakae; Kiyoo Hirose, both of Susono, Japan

[73] Assignee: Toyota Jidosha Kabushiki Kaisha, Toyota, Japan

[21] Appl. No.: 08/939,531

[22] Filed: Sep. 29, 1997

[30] Foreign Application Priority Data

Oct. 7, 1996 [JP] Japan .................................. 8-286020

[51] Int. Cl.⁶ ............................ F01N 3/20; G01M 15/00; B60K 6/00
[52] U.S. Cl. ............................ 60/276; 60/277; 60/605.1; 73/118.1; 123/568.16; 701/114
[58] Field of Search ............................ 60/276, 277, 278, 60/598, 605.1; 73/117.3, 118.1; 123/198 D, 479, 559.1, 568.16, 690; 180/65.4; 701/107, 114

[56] References Cited

U.S. PATENT DOCUMENTS

| | | | |
|---|---|---|---|
| 4,715,348 | 12/1987 | Kobayashi et al. | 701/107 X |
| 5,014,203 | 5/1991 | Miyazaki et al. | 701/107 X |
| 5,179,833 | 1/1993 | Kuroda et al. | 60/277 X |
| 5,331,560 | 7/1994 | Tamura | 701/114 X |
| 5,386,695 | 2/1995 | Iwata et al. | 60/277 X |
| 5,461,569 | 10/1995 | Hara et al. | 701/114 X |
| 5,526,266 | 6/1996 | Rutan et al. | 701/114 X |
| 5,617,337 | 4/1997 | Eidler et al. | 701/114 X |
| 5,818,116 | 10/1998 | Nakae et al. | 290/38 R |

FOREIGN PATENT DOCUMENTS

A-5-248227 9/1993 Japan.

*Primary Examiner*—Tony M. Argenbright
*Attorney, Agent, or Firm*—Oliff & Berridge, PLC

[57] ABSTRACT

After an elapse of a predetermined time period or after a run of a predetermined distance, a power output system of the present invention heats a catalytic converter with a catalyst heater while enabling an engine to be driven under a driving condition suitable for checking a catalyst packed in the catalytic converter for deterioration of the catalytic function. The power output system then measures a variation in temperature of the catalyst in this state and determines whether or not the variation is within a normal range, thereby detecting the deteriorating catalytic function of the catalyst, that is, abnormality of the catalytic converter. This structure enables the power output system to realize accurate detection of abnormality of the catalytic converter at a sufficient frequency. During the measurement of the temperature change of the catalyst, an assist motor is driven and controlled to output a torque Td* corresponding to a step-on amount of an accelerator pedal to a drive shaft. This enables a desired power to be output to the drive shaft even during the course of the abnormality detection. Detection of abnormalities in an engine supercharger and exhaust gas recirculation system is also provided.

20 Claims, 25 Drawing Sheets

APPARATUS FOR DETECTING ABNORMALITY IN INTERNAL COMBUSTION ENGINE-RELATED DEVICE AND POWER OUTPUT SYSTEM WITH SUCH APPARATUS

BACKGROUND OF THE INVENTION

1. Field of the Invention

The present invention relates to an apparatus for detecting abnormality of an internal combustion engine-related device and a power output system with such an apparatus. More specifically, the present invention pertains to an apparatus for detecting abnormality of an internal combustion engine-related device, whose state is affected by the driving condition of an internal combustion engine, as well as to a power output system that has such an apparatus and outputs power to a drive shaft.

2. Description of the Related Art

A proposed abnormality detection apparatus for an internal combustion engine-related device detects deterioration of a catalyst packed in a catalytic converter for converting a gaseous exhaust discharged from an internal combustion engine (for example, JAPANESE PATENT LAYING-OPEN GAZETTE No. 5-248227). In this apparatus, deterioration of the catalyst is detected in the following manner. When the internal combustion engine has reached a predetermined driving condition that enables detection of deterioration of the catalyst, the amount of fuel injection is alternately increased and decreased at every 0.5 seconds by 4 to 10% around the mean value in this state. After the start of the inverted variation, signals measured by oxygen sensors disposed before and after the catalytic converter in an air exhaust conduit are respectively plotted for a predetermined time period. The apparatus then accumulates the areas of the oxygen-rich state of the respective plotted sensor signals (the time of the oxygen-rich state in the case of binary signals) and calculates a difference between the respective total areas. When the difference is not less than a predetermined value, it is determined that the catalyst has not deteriorated yet. When the difference is less than the predetermined value, on the other hand, it is determined that the catalyst has deteriorated.

This proposed apparatus, however, has a problem, that is, a difficulty in accurate detection of deterioration of the catalyst. In order to detect deterioration of the catalyst with high accuracy, the internal combustion engine should be kept under the predetermined driving condition for at least a predetermined time period. The driving condition of the internal combustion engine mounted on the vehicle is, however, varied by an instruction of the driver, so that it is rare that the internal combustion engine keeps the same driving condition for the predetermined or longer time period. Even when the internal combustion engine can be kept under the same driving condition for the predetermined or longer time period, the driving condition may be not suitable for detecting deterioration of the catalyst. In order to realize accurate detection of deterioration of the catalyst, detection is carried out only when the internal combustion engine is under the driving condition that is suitable for detecting deterioration of the catalyst. This results in a low frequency of detection and may cause the deteriorating catalyst to be not detected for a relatively long time. An increased frequency of detection for the purpose of avoiding such a problem causes detection to be carried out even when the internal combustion engine is not under the suitable driving condition. This lowers the accuracy of detection and may result in a wrong detection of deterioration of the catalyst.

The above problem arising in the process of detecting abnormality when the internal combustion engine is kept under the predetermined driving condition for the predetermined or longer time period is not restricted to detection of the deteriorating catalyst packed in the catalytic converter, but is also found in any apparatus, whose state is varied by the driving condition of the internal combustion engine.

SUMMARY OF THE INVENTION

One object of the present invention is thus to provide an abnormality detection apparatus for an internal combustion engine-related device, which detects abnormality of the internal combustion engine-related device at a sufficient frequency.

Another object of the present invention is to provide an abnormality detection apparatus for an internal combustion engine-related device, which realizes accurate detection of abnormality of the internal combustion engine-related device.

At least part of the above and the other related objects is realized by an abnormality detection apparatus of the invention. The first abnormality detection apparatus comprises:

physical quantity measurement means for measuring a physical quantity that reflects a state of the internal combustion engine-related device;

engine operation control means for controlling operation of the internal combustion engine to a predetermined driving condition, in response to a predetermined instruction; and abnormality detection means for detecting abnormality of the internal combustion engine-related device based on the physical quantity, when the engine operation control means causes the internal combustion engine to be driven under the predetermined driving condition.

The internal combustion engine-related device may be converter means having a catalyst for converting a gaseous exhaust discharged from the internal combustion engine, supercharger means for pressurizing the air and supplying the pressurized air to the internal combustion engine, exhaust gas recirculation means for circulating part of a gaseous exhaust discharged from the internal combustion engine into an air intake conduit of the internal combustion engine at a predetermined timing, idle driving means for enabling the internal combustion engine to be driven at an idle engine speed, or intake and exhaust timing regulation means for regulating the timings of air intake and exhaust of the internal combustion engine. The physical quantity reflecting the state of the internal combustion engine-related device may be the temperature or pressure in a member of the internal combustion engine-related device or a system concerned with the internal combustion engine-related device, or the amount of a substance, such as oxygen. By way of example, in case that the internal combustion engine-related device is the converter means, the physical quantity is the temperature of the catalyst of the converter means or the amount of oxygen included in the gaseous fuel converted by the converter means. In case that the internal combustion engine-related device is the supercharger means, the physical quantity is the pressure in an air intake conduit of the internal combustion engine. In case that the internal combustion engine-related device is the exhaust gas recirculation means, the physical quantity is the temperature in a circulation pipe of the exhaust gas recirculation means, which enables circulation of the gaseous exhaust into the air intake conduit of the internal combustion engine. The predetermined driving condition represents the driving condition of the internal combustion engine that enables the state of the internal combustion engine-related device to be accurately detected by the physical quantity. This includes a fixed driving condition and a varying driving condition that follows a plurality of preset driving conditions against the elapse of time.

The abnormality detection apparatus of the present invention enables the internal combustion engine to be driven under the predetermined driving condition that is suitable for detection of the state of the internal combustion engine-related device, thereby realizing accurate detection of abnormality of the combustion engine-related device.

In accordance with one preferable application, the abnormality detection apparatus includes abnormality display means for, when the abnormality detection means detects abnormality of the internal combustion engine-related device, displaying the detected abnormality. This structure adequately informs the driver of abnormality without delay.

Another object of the present invention is to provide a power output system that outputs a desired power to a drive shaft even during the course of detection of abnormality of such an internal combustion engine-related device.

Still another object of the present invention is to reduce or eliminate a loading applied to the internal combustion engine-related device in response to a detection of abnormality, while outputting a desired power to the drive shaft.

At least part of the above and the other related objects is realized by a power output system of the invention. The first power output system comprises:
the internal combustion engine;
an internal combustion engine-related device, whose state is varied by a driving condition of the internal combustion engine;
a motor connecting with the drive shaft, whereby power is transmitted between the motor and the drive shaft;
electric power supply means for supplying electric power required for the transmission of the power by the motor;
physical quantity measurement means for measuring a physical quantity that reflects the state of the internal combustion engine-related device;
engine operation control means for controlling operation of the internal combustion engine to a predetermined driving condition, in response to a predetermined instruction; and
abnormality detection means for detecting abnormality of the internal combustion engine-related device based on the physical quantity measured by the physical quantity measurement means, when the engine operation control means causes the internal combustion engine to be driven under the predetermined driving condition.

The power output system of the present invention enables the motor to output the power to the drive shaft even during the course of detection of abnormality of the internal combustion engine-related device. The abnormality detection apparatus included in the power output system realizes accurate detection of abnormality of the internal combustion engine-related device.

In accordance with another possible application, the power output system further comprises:
motor control means for controlling the motor to output a required power to the drive shaft in response to the predetermined instruction.

This structure enables the required torque to be output to the drive shaft even during the course of detection of abnormality of the internal combustion engine-related device.

In accordance with another possible application, the internal combustion engine is mechanically linked with the drive shaft,
the motor control means comprises means for controlling the motor to output a power difference between a power output from the internal combustion engine controlled by the engine operation control means and the required power.

This structure enables the sum of the power output from the internal combustion engine driven under the predetermined condition and the power output from the motor to be output to the drive shaft as the required power, during the course of detection of abnormality of the internal combustion engine-related device.

In accordance with another possible application, the engine operation control means comprises means for, when a required power to be output to the drive shaft is not less than a predetermined level, prohibiting the control of the internal combustion engine to the predetermined driving condition, irrespective of the predetermined instruction.

This structure enables the internal combustion engine to be driven under the driving condition corresponding to the required power, thus enabling the required power to be output from the internal combustion engine and the motor to the drive shaft.

the engine operation control means comprises means for stopping the control of the internal combustion engine to the predetermined driving condition, when a required power to be output to the drive shaft is varied to be not less than a predetermined level during the course of the control of the internal combustion engine.

This structure enables the internal combustion engine to be immediately shifted from the predetermined driving condition to the driving condition corresponding to the required power, thus enabling the required power to be output from the internal combustion engine and the motor to the drive shaft.

In accordance with another possible application, the power output system further comprises:
engine control means for, when the abnormality detection means detects abnormality of the internal combustion engine-related device, controlling the internal combustion engine to a predetermined second driving condition, which is different from the predetermined driving condition.

The predetermined second driving condition represents a driving condition, in which a smaller loading is applied to the internal combustion engine-related device, or a driving condition, in which the internal combustion engine-related device stops its operation. This structure reduces the loading applied to the internal combustion engine-related device or stops the operation of the internal combustion engine-related device, thus relieving or eliminating the problem due to the abnormality of the internal combustion engine-related device.

In accordance with another possible application, the motor control means is a first motor control means, and the power output system further comprises:
second motor control means for, when the engine control means controls the internal combustion engine to the predetermined second driving condition, controlling the motor to output a required power to the drive shaft.

This structure enables the required power to be output to the drive shaft even when abnormality of the internal combustion engine-related device is detected.

In accordance with another possible application, a power output system further comprises:

a pair-rotor motor comprising a first rotor connecting with an output shaft of the internal combustion engine and a second rotor connecting with the drive shaft, the second rotor being rotatable relative to the first rotor, the first and second rotors being electromagnetically connected with each other, whereby power is transmitted between the output shaft of the internal combustion engine and the drive shaft via an electromagnetic coupling of the first rotor with the second rotor.

This structure enables the output shaft of the internal combustion engine to be rotated independently of the revolving speed of the drive shaft, and allows at least part of the power output from the internal combustion engine to be output to the drive shaft.

In accordance with another possible application, the motor comprises the second rotor of the pair-rotor motor and a stator that rotates the second rotor.

This structure reduces the whole system in size.

In accordance with another possible application, the power output system further comprises:

three shaft-type power input/output means having three shafts, the three shaft-type power input/output means inputting and outputting power to and from a residual one shaft, based on predetermined powers input to and output from any two shafts among the three shafts, wherein an output shaft of the internal combustion engine and the drive shaft are linked with any two of the three shafts.

This structure enables the output shaft of the internal combustion engine to be rotated independently of the revolving speed of the drive shaft, and allows at least part of the power output from the internal combustion engine to be output to the drive shaft.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
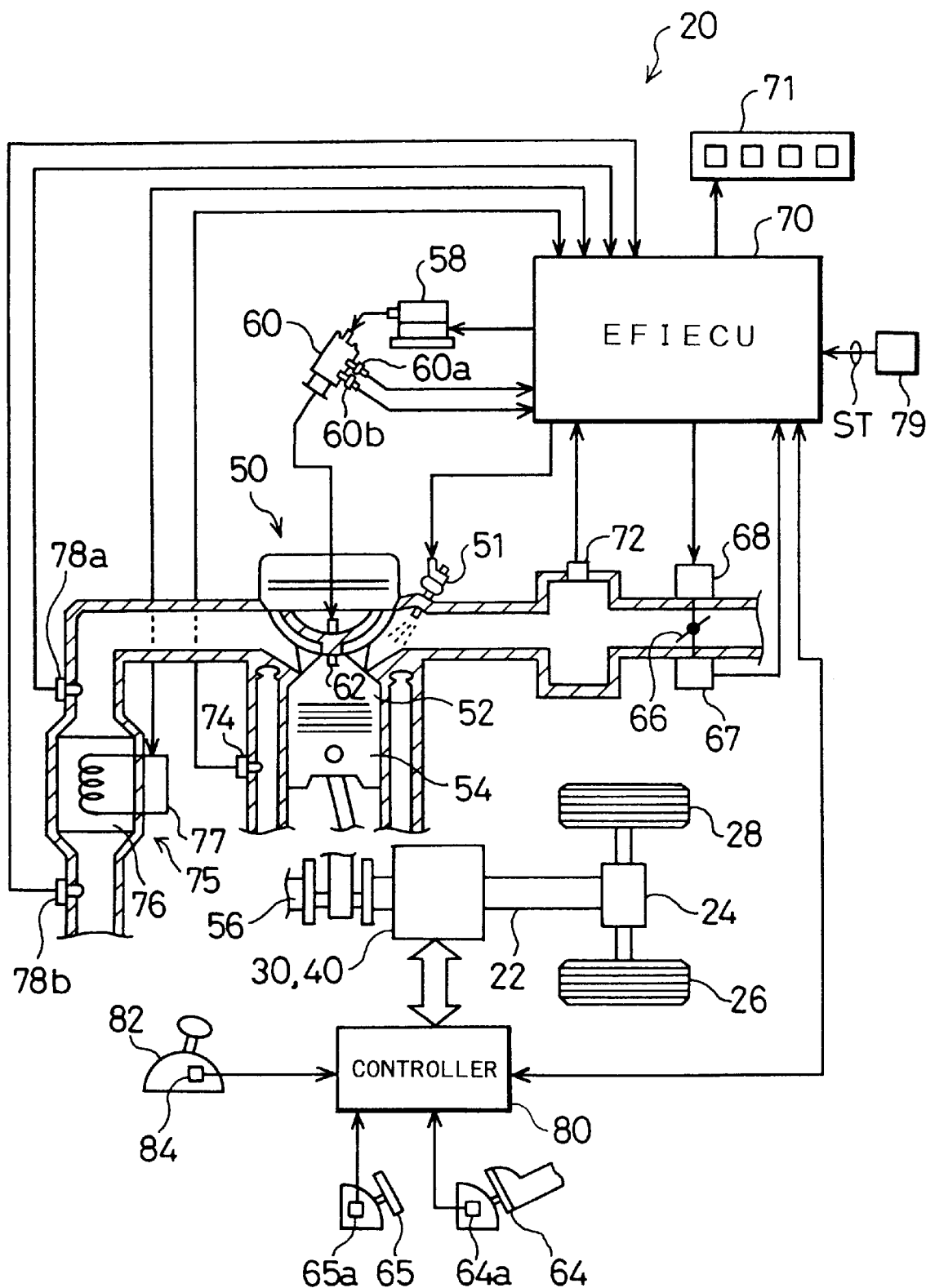
FIG. 1 schematically illustrates structure of a vehicle with a power output system 20 incorporated therein and having an abnormality detection apparatus for detecting abnormality of a three-way catalyst 76 packed in a catalytic converter 75 as a first embodiment according to the present invention.

Some modes of carrying out the present invention are discussed below as preferred embodiments. FIG. 1 schematically illustrates structure of a vehicle with a power output system 20 incorporated therein and having an abnormality detection apparatus for detecting abnormality of a three-way catalyst 76 packed in a catalytic converter 75 as a first embodiment according to the present invention.

Referring to FIG. 1, the vehicle is provided with an engine 50 which consumes gasoline as a fuel and outputs power. The air ingested from an air supply system via a throttle valve 66 is mixed with a fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture. A three-way catalyst 76, which is packed in a catalytic converter 75, oxidizes carbon monoxide (CO) and hydrocarbons (CH) included in the gaseous exhaust and simultaneously reduces nitrogen oxides (NOx). The gaseous exhaust discharged from the engine 50 is converted by the catalytic converter 75 and released to the atmosphere.

Operation of the engine 50 is controlled by an electronic control unit (hereinafter referred to as EFIECU) 70. The EFIECU 70 receives information from a variety of sensors, which detect operating conditions of the engine 50. These sensors include a throttle valve position sensor 67 for detecting a valve travel or position of the throttle valve 66, a manifold vacuum sensor 72 for measuring a load applied to the engine 50, a water temperature sensor 74 for measuring the temperature of cooling water in the engine 50, a speed sensor 60a and an angle sensor 60b mounted on the distributor 60 for measuring the revolving speed (the number of revolutions per a predetermined time period) and the rotational angle of the crankshaft 56, and an oxygen sensor 78a for measuring oxygen included in the gaseous exhaust in order to correct the air/fuel ratio of the air/fuel mixture supplied to the engine 50. A starter switch 79 for detecting a starting condition ST of an ignition key (not shown), a catalyst heater 77 for heating and activating the three-way catalyst 76 and measuring a resistance in order to determine the temperature of the three-way catalyst 76, and a sub-oxygen sensor 78b for measuring oxygen included in the gaseous fuel discharged from the catalytic converter 75 are also connected to the EFIECU 70. Other sensors and switches connecting with the EFIECU 70 are omitted from the illustration. A display 71 that is also connected to the EFIECU 70 outputs driving conditions of various devices included in the power output system 20. The driving conditions are based on the signals output from the variety of sensors mentioned above.

The crankshaft 56 of the engine 50 is linked with a drive shaft 22 via a clutch motor 30 and an assist motor 40, which will be described in detail below. The drive shaft 22 further connects with a differential gear 24, which eventually transmits the torque output from the drive shaft 22 of the power output system 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82, an accelerator pedal position sensor 64a attached to an accelerator pedal 64, and a brake pedal position sensor 65a attached to a brake pedal 65. The controller 80 sends and receives a variety of data and information to and from the EFIECU 70 through communication. Details of the control procedure including a communication protocol will be described later.

Figure 2:
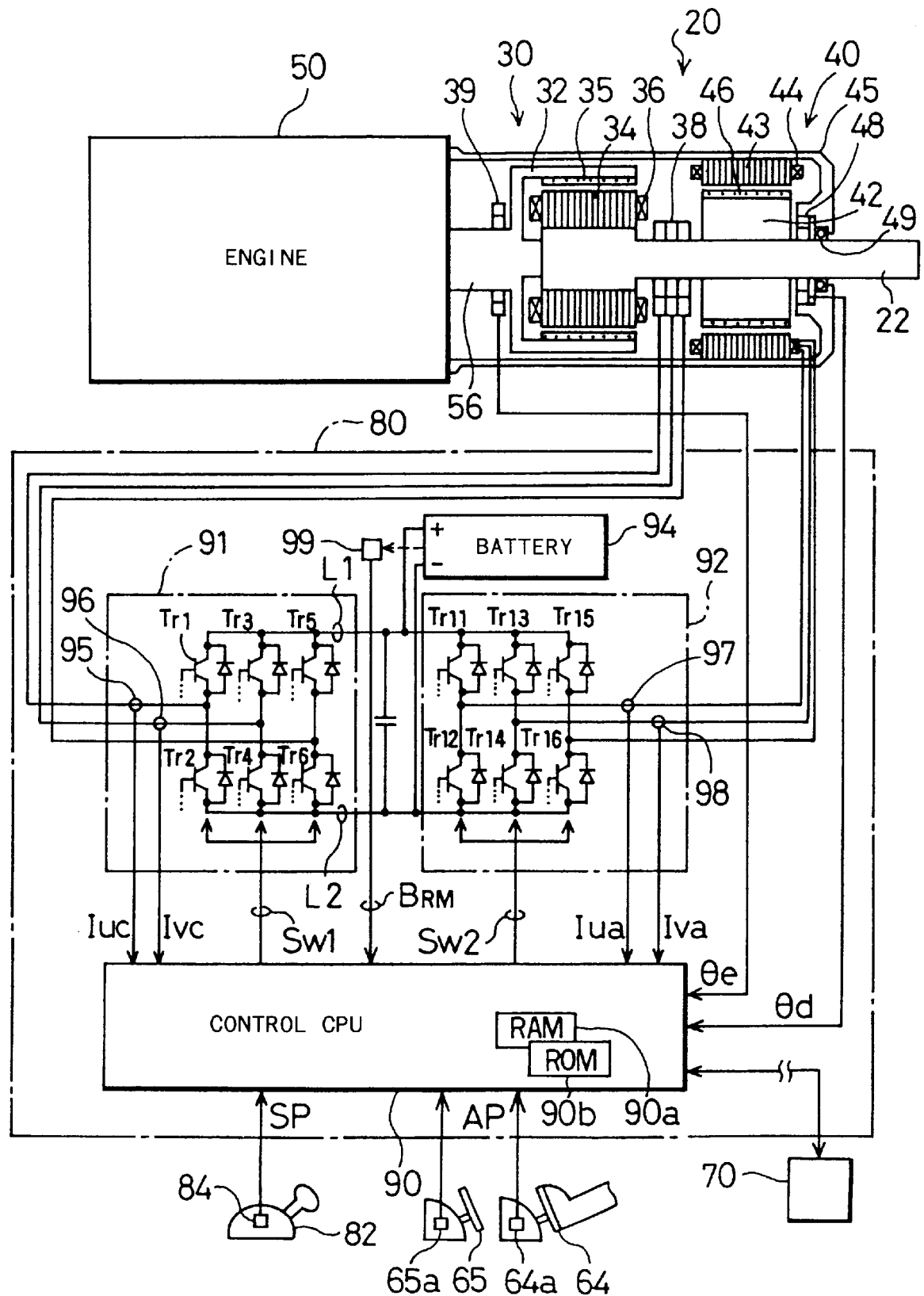
FIG. 2 schematically illustrates structure of the power output system 20 of the first embodiment.

FIG. 2 schematically illustrates structure of the power output system 20 of the first embodiment. Referring to FIG. 2, the power output system 20 essentially includes the engine 50 for generating power, the clutch motor 30 having an outer rotor 32 and an inner rotor 34, the assist motor 40 having a rotor 42 linked with the drive shaft 22, and the controller 80 for driving and controlling the clutch motor 30 and the assist motor 40. The outer rotor 32 of the clutch motor 30 is linked with the crankshaft 56 of the engine 50, whereas the inner rotor 34 is linked with the drive shaft 22.

The clutch motor 30 is constructed as a synchronous motor having permanent magnets 35 attached to an inner surface of the outer rotor 32 and three-phase coils 36 wound on slots formed in the inner rotor 34. Electric power is supplied to the three-phase coils 36 via a slip ring 38. Laminated sheets of non-directional electromagnetic steel are used to form teeth and slots for the three-phase coils 36 in the inner rotor 34. A resolver 39 for measuring a rotational angle $\theta e$ of the crankshaft 56 is attached to the crankshaft 56. The resolver 39 may also serve as the angle sensor 60b mounted on the distributor 60.

The assist motor 40 is also constructed as a synchronous motor having three-phase coils 44, which are wound on a stator 43 fixed to the casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42. The rotor 42 is mechanically linked with the drive shaft 22 working as the torque output shaft of the power output system 20. A resolver 48 for measuring a rotational angle $\theta d$ of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. The axial torque output from the engine 50 to the crankshaft 56 is accordingly output via the outer rotor 32 and the inner rotor 34 of the clutch motor 30 to the drive shaft 22, while the torque from the assist motor 40 is added to or subtracted from the transmitted axial torque.

While the assist motor 40 is constructed as a conventional permanent magnet-type three-phase synchronous motor, the clutch motor 30 includes two rotating elements or rotors, that is, the outer rotor 32 with the permanent magnets 35 mounted thereon and the inner rotor 34 with the three-phase coils 36 wound thereon. The following describes the detailed structure of the clutch motor 30. As mentioned previously, the outer rotor 32 of the clutch motor 30, on which the permanent magnets 35 are mounted, is linked with the crankshaft 56, and the inner rotor 34 with the drive shaft 22. In this embodiment, a total of eight permanent magnets 35 (four N poles and four S poles) are attached to the inner circumferential surface of the outer rotor 32. The permanent magnets 35 are magnetized in the direction towards the axial center of the clutch motor 30 and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied via the slip ring 38. The slip ring 38 includes rotary rings 38a fixed to the drive shaft 22 and brushes 38b. There are three sets of rotary rings 38a and brushes 38b in the slip ring 38, in order to receive and supply electric currents of three phases (U, V, and W phases).

Interaction between a magnetic field formed by one adjoining pair of permanent magnets 35 and a revolving magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally four times the difference between the revolving speed of the outer rotor 32 directly connected to the crankshaft 56 and the revolving speed of the inner rotor 34.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input port. The input data include a rotational angle θe of the crankshaft 56 of the engine 50 measured with the resolver 39, a rotational angle θd of the drive shaft 22 measured with the resolver 48, an accelerator pedal position AP (step-on amount of the accelerator pedal 64) output from the accelerator pedal position sensor 64a, a brake pedal position BP (step-on amount of the brake pedal 65) output from the brake pedal position sensor 65a, a gearshift position SP output from the gearshift position sensor 84, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines L1 and L2. The three-phase coils (U,V,W) 36 of the clutch motor 30 are connected via the slip ring 38 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output system 20 of the embodiment thus constructed works in accordance with the operation principles discussed below, especially with the principle of torque conversion. By way of example, it is assumed that the engine 50 driven by the EFIECU 70 rotates at a revolving speed Ne that is equal to a predetermined value N1. While the transistors Tr1 through Tr6 in the first driving circuit 91 are in OFF position, the controller 80 does not supply any electric current to the three-phase coils 36 of the clutch motor 30 via the slip ring 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current flows through the three-phase coils 36 of the clutch motor 30, based on the difference between the revolving speed Ne of the crankshaft 56 of the engine 50 and a revolving speed Nd of the drive shaft 22 (in other words, a difference Nc (=Ne−Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the engine 50 (revolving speed of the crankshaft 56). In this state, the clutch motor 30 functions as a generator, that is, carries out the regenerative operation to regenerate an electric current via the first driving circuit 91 and charges the battery 94 with the electric power thus regenerated. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 3:
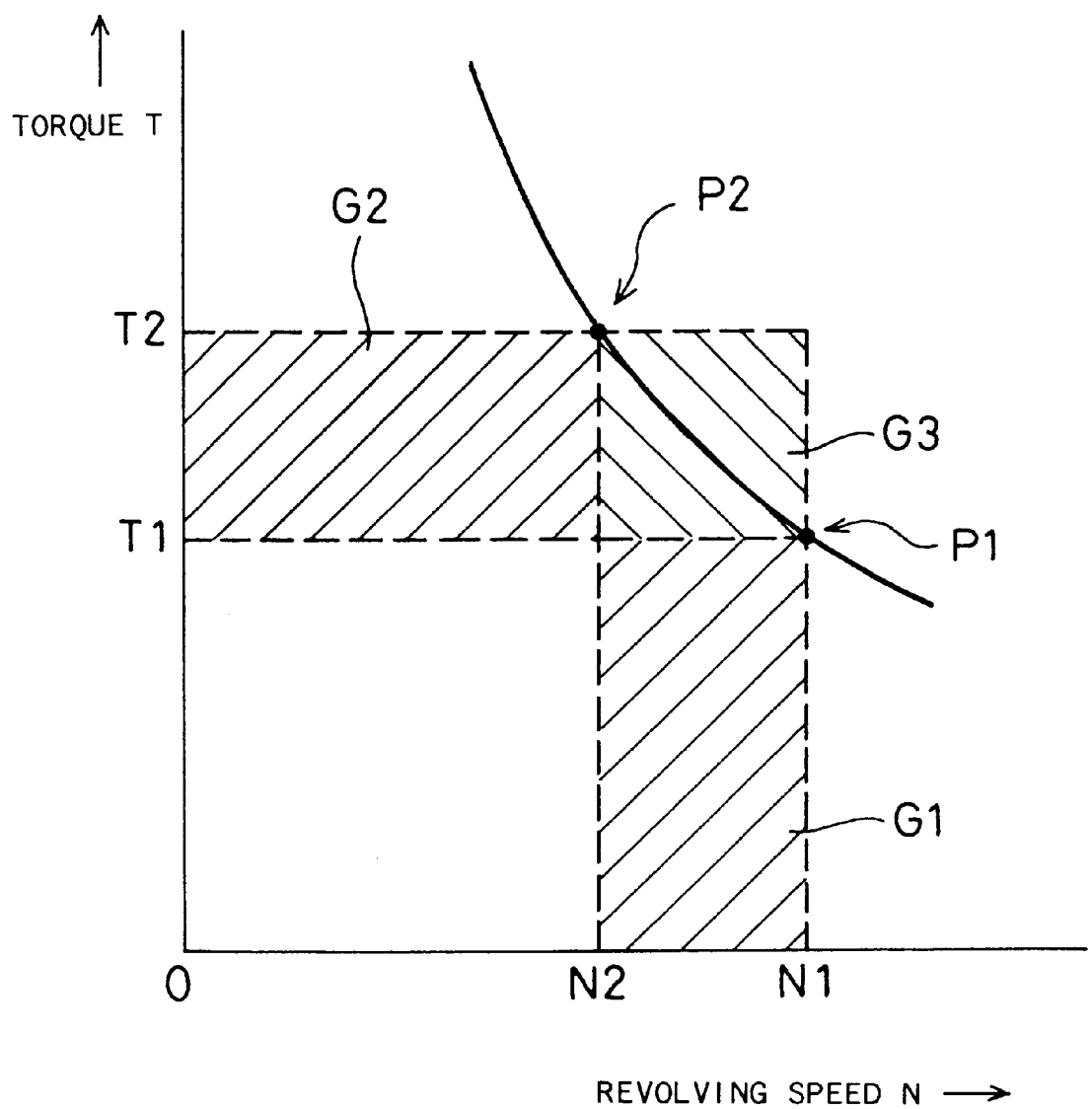
FIG. 3 is a graph showing the operation principle of the power output system 20 of the first embodiment.

Referring to FIG. 3, when the engine 50 is driven at a driving point P1 defined by the revolving speed N1 and a torque T1, the clutch motor 30 transmits the torque T1 to the drive shaft 22 and regenerates energy expressed as an area G1. The regenerative energy is supplied to the assist motor 40 as energy expressed as an area G2, so that the drive shaft 22 is rotated at a driving point P2 defined by a revolving speed N2 and a torque T2.

In accordance with another example, it is assumed that the engine 50 is driven at the revolving speed Ne equal to a value N2 and with the torque Te equal to a value T2, while the drive shaft 22 is rotated at a revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). The clutch motor 30 accordingly functions as a normal motor and consumes electric power supplied from the battery 94 to give the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the electric power regenerated by the assist motor 40, the control CPU 90 controls both the first driving circuit 91 and the second driving circuit 92. This enables the clutch motor 30 to be driven without using electric power stored in the battery 94.

Referring to FIG. 3, when the crankshaft 56 is driven at the revolving speed N2 and the torque T2, energy expressed as the sum of the areas G1 and G3 is supplied to the clutch motor 30, so as to output the torque T2 to the drive shaft 22. The energy supplied to the clutch motor 30 is regenerated by the assist motor 40 as energy expressed as the sum of the areas G2 and G3. This causes the drive shaft 22 to be driven at the driving point P1 defined by the revolving speed N1 and the torque T1.

In the above examples, all the power output from the engine 50 is subjected to torque conversion and output to the drive shaft 22. Other than such torque conversion, the power output system 20 of the embodiment can charge the battery 94 with an excess of electrical energy or discharge the battery 94 to supplement the electrical energy. This is implemented by controlling the output energy from the engine 50 (that is, the product of the torque Te and the revolving speed Ne), the electrical energy regenerated or consumed by the clutch motor 30, and the electrical energy consumed or regenerated by the assist motor 40.

The power output system 20 of the embodiment carries out an operation of checking the three-way catalyst 76 packed in the catalytic converter 75 for deterioration of the catalytic function and a control operation in the case of detection of the deteriorating three-way catalyst 76. These operations are based on a torque control routine shown in the flowchart of FIG. 4 and an abnormality detection routine shown in the flowchart of FIG. 7.

Figure 4:
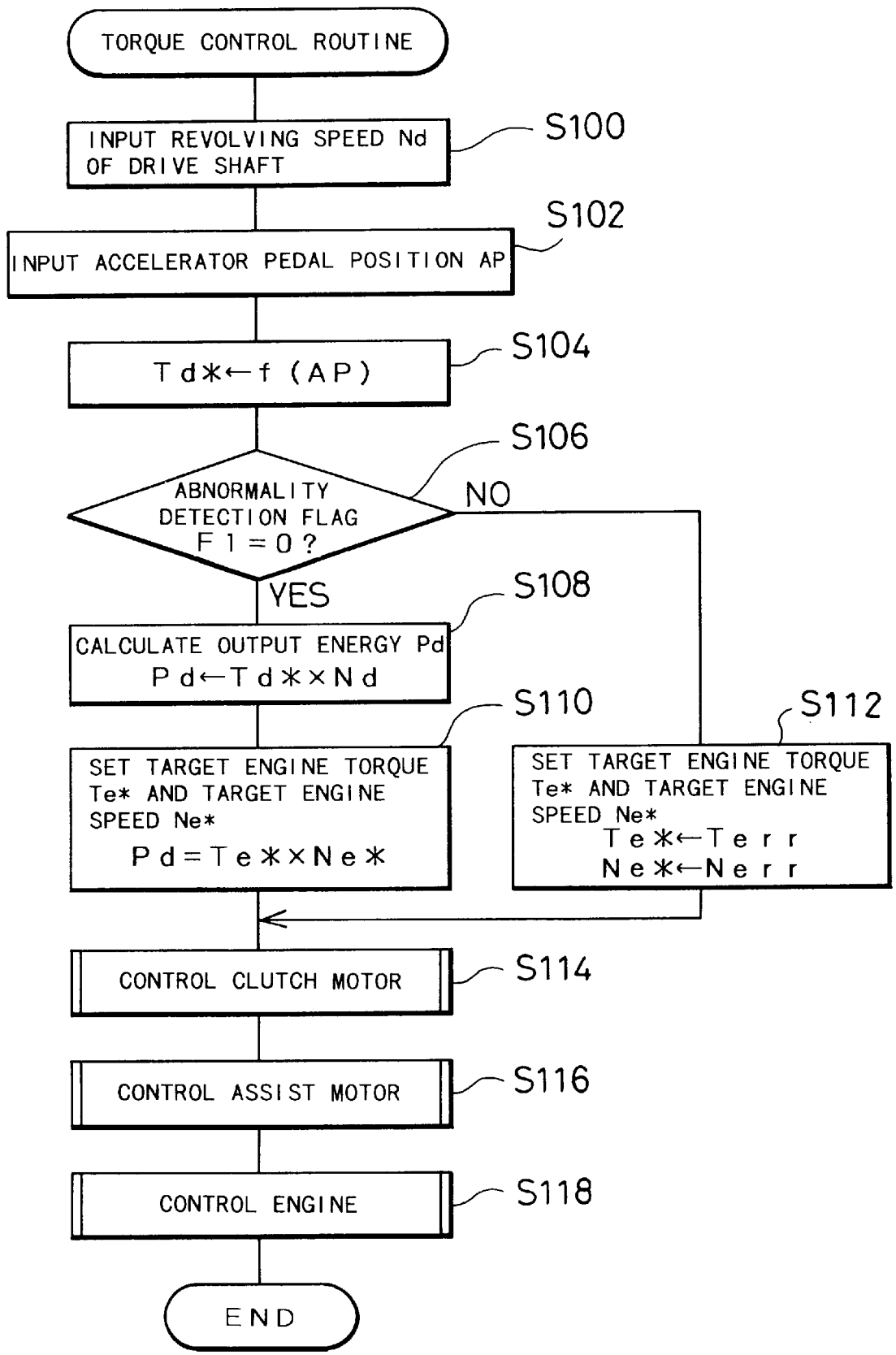
FIG. 4 is a flowchart showing a torque control routine executed by the control CPU 90 of the controller 80 in the first embodiment.

The torque control routine of FIG. 4 is repeatedly carried out at predetermined time intervals, for example, at every 8 msec, after a start of the vehicle. When the program enters the routine of FIG. 4, the control CPU 90 of the controller 80 first reads the revolving speed Nd of the drive shaft 22 at step S100. The revolving speed Nd of the drive shaft 22 may be calculated from the rotational angle θd of the drive shaft 22 read from the resolver 48. The control CPU 90 then reads the accelerator pedal position AP (that is, the step-on amount of the accelerator pedal 64) detected by the accelerator pedal position sensor 64a at step S102. The driver steps on the accelerator pedal 64 when feeling insufficiency of the output torque. The value of the accelerator pedal position AP accordingly represents the desired output torque (that is, the torque to be output to the drive shaft 22) which the driver requires. At subsequent step S104, the control CPU 90 determines an output torque command value Td* or a target torque to be output to the drive shaft 22, based on the input accelerator pedal position AP. In this embodiment, a map representing the relationship between the output torque command value Td* and the accelerator pedal position AP is prepared in advance and stored in the ROM 90b. In accordance with a concrete procedure, at step S104, the torque command value Td* corresponding to the input accelerator pedal position AP is read from the map stored in the ROM 90b.

The program then checks the value of an abnormality detection flag F1 at step S106. The abnormality detection flag F1 is switched between one and zero, based on whether or not any abnormality exists in the catalytic converter 75, and is set by the abnormality detection routine shown in the flowchart of FIG. 7 as discussed later. In case that the abnormality detection flag F1 is equal to zero at step S106, the program determines that no abnormality is found in the catalytic converter 75 and proceeds to steps S108 and S110 in order to set a target torque Te* and a target revolving speed Ne* of the engine 50. In accordance with a concrete procedure, at step S108, an amount of energy Pd to be output to the drive shaft 22 is calculated from the output torque command value Td* and the input revolving speed Nd of the drive shaft 22 according to the equation of Pd=Td*×Nd. The program then proceeds to step S110 at which the control CPU 90 sets the target torque Te* and the target revolving speed Ne* of the engine 50 based on the output energy Pd thus obtained. It is here assumed that the energy Pd to be output to the drive shaft 22 is all supplied by the engine 50. The energy output from the engine 50 is equal to the product of the torque Te and the revolving speed Ne of the engine 50, so that the relationship between the output energy Pd and the target torque Te* and the target revolving speed Ne* of the engine 50 can be expressed as Pd=Te*×Ne*. There are, however, numerous combinations of the target torque Te* and the target revolving speed Ne* of the engine 50 satisfying the above relationship. In this embodiment, a favorable combination of the target torque Te* and the target revolving speed Ne* of the engine 50 is set in order to enable the engine 50 to be driven at the highest possible efficiency.

In case that the abnormality detection flag F1 is equal to one at step S106, on the other hand, the program determines that abnormality exists in the catalytic converter 75 and proceeds to step S112 to set a predetermined torque Terr to the target engine torque Te* and a predetermined revolving speed Nerr to the target engine speed Ne*. The predetermined torque Terr and the predetermined revolving speed Nerr are specified, for example, experimentally, as a driving state that enables the concentrations of carbon monoxide (CO), hydrocarbons (CH), and nitrogen oxides (NOx) exhausted from the engine 50 to be less than the allowable levels for the release to the atmosphere.

After setting the target torque Te* and the target revolving speed Ne* of the engine 50, the program proceeds to steps S114, S116, and S118 to respectively control the clutch motor 30, the assist motor 40, and the engine 50, in order to drive the engine 50 at the preset target values and output the torque corresponding to the accelerator pedal position AP (that is, the output torque command value Td*) to the drive shaft 22. In this embodiment, for convenience of illustration, the control operations of the clutch motor 30, the assist motor 40, and the engine 50 are shown as steps in the torque control routine. In the actual procedure, however, these control operations are carried out comprehensively and independently of this routine. By way of example, the control CPU 90 controls the clutch motor 30 and the assist motor 40 in parallel at a different timing from this routine by utilizing an interrupting process, while transmitting an instruction to the EFIECU 70 through communication in order to allow the EFIECU 70 to control the engine 50 concurrently.

Figure 5:
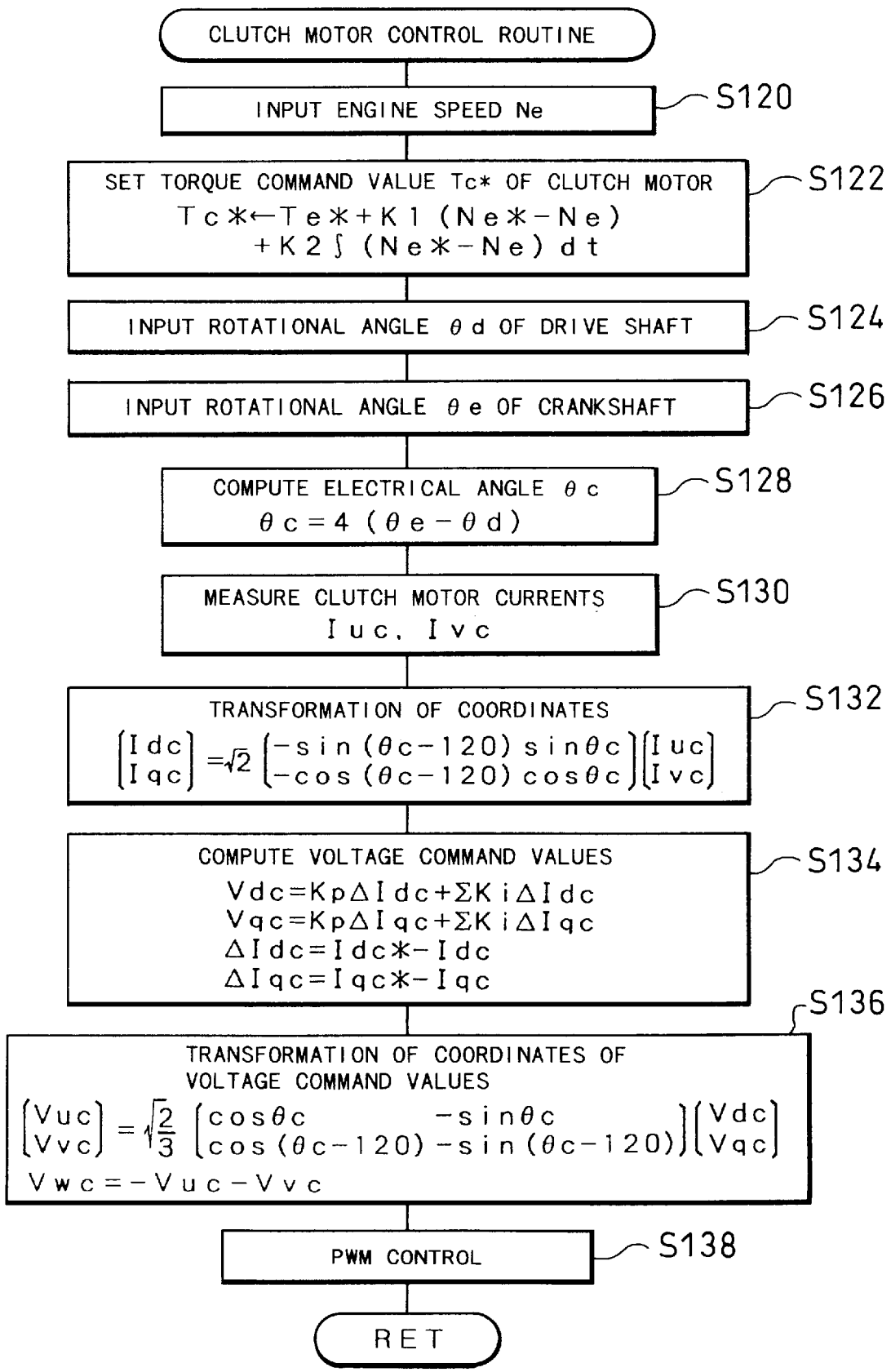
FIG. 5 is a flowchart showing a clutch motor control routine executed by the control CPU 90 of the controller 80.

The control procedure of the clutch motor 30 executed at step S114 in the flowchart of FIG. 4 follows a clutch motor control routine shown in the flowchart of FIG. 5. When the program enters the clutch motor control routine, the control CPU 90 of the controller 80 first reads the revolving speed Ne of the engine 50 at step S120. The revolving speed Ne of the engine 50 may be calculated from the rotational angle θe of the crankshaft 56 read from the resolver 39 or directly measured by the speed sensor 60a mounted on the distributor 60. In case that the speed sensor 60a is used, the control CPU 90 receives data of the revolving speed Ne from the EFIECU 70 connecting with the speed sensor 60a through communication.

At subsequent step S122, the control CPU 90 calculates a torque command value Tc* of the clutch motor 30 from the observed revolving speed Ne of the engine 50 and the target torque Te* and the target revolving speed Ne* of the engine 50 set by the torque control routine of FIG. 4, according to Equation (1) given below. The second term in the right side of Equation (1) is a proportional term to cancel the deviation of the observed revolving speed Ne from the target revolving speed Ne* of the engine 50, and the third term is an integral term to cancel a stationary deviation. In the stationary state (that is, when the deviation of the observed revolving speed Ne from the target revolving speed Ne* of the engine 50 is equal to zero), the target torque Te* of the engine 50 is set to the torque command value Tc* of the clutch motor 30. Since the torque Tc of the clutch motor 30 works as the loading torque of the engine 50, setting the target torque Te* of the engine 50 to the torque command value Tc* of the clutch motor 30 enables the engine 50 to be stably driven at the target torque Te*. K1 and K2 in Equation (1) denote proportional constants.

$$Tc^* \leftarrow Te^* + K1(Ne^*-Ne) + K2\int(Ne^*-Ne)dt \quad (1)$$

The control CPU 90 then reads the rotational angle θd of the drive shaft 22 from the resolver 48 and the rotational angle θe of the crankshaft 56 of the engine 50 from the resolver 39 at steps S124 and S126. The control CPU 90 then computes an electrical angle θc of the clutch motor 30 from the input rotational angles θe and θd at step S128. A synchronous motor having four pairs of poles is used as the clutch motor 30 in this embodiment, and the electrical angle θc is thus obtained by an equation of θc=4(θe−θd). The program proceeds to step S130, at which the control CPU 90 reads the clutch motor currents Iuc and Ivc, which respectively flow through the U phase and V phase of the three-phase coils 36 in the clutch motor 30 and are measured by the ammeters 95 and 96. Although the electric currents naturally flow through all the three phases U, V, and W, measurement is required only for the electric currents passing through the two phases since the sum of the currents is equal to zero. At subsequent step S132, the control CPU 90 executes transformation of coordinates (three-phase to two-phase transformation) using the values of electric currents flowing through the three phases obtained at step S130. The transformation of coordinates maps the values of electric currents flowing through the three phases to the values of electric currents passing through d and q axes of the permanent magnet-type synchronous motor and is implemented by the Equation (2) given below. The transformation of coordinates is carried out because the electric currents flowing through the d and q axes are essential quantities for the torque control in the permanent magnet-type synchronous motor. Alternatively, the torque control may be executed directly with the electric currents flowing through the three phases.

$$\begin{bmatrix} Idc \\ Iqc \end{bmatrix} = \sqrt{2}\begin{bmatrix} -\sin(\theta c - 120) & \sin\theta c \\ -\cos(\theta c - 120) & \cos\theta c \end{bmatrix}\begin{bmatrix} Iuc \\ Ivc \end{bmatrix} \quad (2)$$

After the transformation to the electric currents of two axes, the control CPU 90 computes deviations of electric currents Idc and Iqc actually flowing through the d and q axes from electric current command values Idc* and Iqc* of the respective axes, which are calculated from the torque command value Tc* of the clutch motor 30, and subsequently determines voltage command values Vdc and Vqc with respect to the d and q axes at step S134. In accordance with a concrete procedure, the control CPU 90 executes arithmetic operations of Equations (3) and Equations (4) given below. In Equations (3) and (4), Kp1, Kp2, Ki1, and Ki2 represent coefficients, which are adjusted to be suited to the characteristics of the motor applied. Each voltage command value Vdc (Vqc) includes a part in proportion to the deviation ΔI from the current command value I* (the first term in the right side of Equation (4)) and a summation of historical data of the deviations ΔI for 'i' times (the second term in the right side).

$$\Delta Idc = Idc^* - Idc$$

$$\Delta Iqc = Iqc^* - Iqc \quad (3)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (4)$$

The control CPU 90 then re-transforms the coordinates of the voltage command values thus obtained (two-phase to three-phase transformation) at step S136. This corresponds to an inverse of the transformation executed at step S132. The inverse transformation determines voltages Vuc, Vvc, and Vwc actually applied to the three-phase coils 34 as expressed by Equations (5) given below:

$$\begin{bmatrix} Vuc \\ Vvc \end{bmatrix} = \sqrt{\frac{2}{3}}\begin{bmatrix} \cos\theta c & -\sin\theta c \\ \cos(\theta c - 120) & -\sin(\theta c - 120) \end{bmatrix}\begin{bmatrix} Vdc \\ Vqc \end{bmatrix} \quad (5)$$

$$Vwc = -Vuc - Vvc$$

The actual voltage control is accomplished by on-off operation of the transistors Tr1 through Tr6 in the first driving circuit 91. At step S138, the on- and off-time of the transistors Tr1 through Tr6 in the first driving circuit 91 is PWM (pulse width modulation) controlled in order to attain the voltage command values Vuc, Vvc, and Vwc determined by Equations (5) above.

The torque command value Tc* of the clutch motor 30 is positive when a positive torque is applied to the drive shaft 22 in the direction of rotation of the crankshaft 56. By way of example, it is assumed that a positive value is set to the torque command value Tc*. When the revolving speed Ne of the engine 50 is higher than the revolving speed Nd of the drive shaft 22 on this assumption, that is, when the revolving speed difference Nc (=Ne−Nd) is positive, the clutch motor 30 is controlled to carry out the regenerative operation and produce a regenerative electric current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 in the first driving circuit 91 are controlled to enable a positive torque to be applied to the drive shaft 22 by the combination of the magnetic field generated by the permanent magnets 35 set on the outer rotor 32 with the revolving magnetic field generated by the electric currents flowing through the three-phase coils 36 wound on the inner rotor 34 of the clutch motor 30. The identical switching control is executed for both the regenerative operation and the power operation of the clutch motor 30 as long as the sign of the torque command value Tc* is not changed. The clutch motor control routine of FIG. 5 is thus applicable to both the regenerative operation and the power operation. Under the condition of braking the drive shaft 22 or moving the vehicle in reverse, the torque command value Tc* has the negative sign. The clutch motor control routine of FIG. 5 is also applicable to the control procedure under such conditions, when the electrical angle θc obtained at step S128 is varied in the reverse direction.

Figure 6:
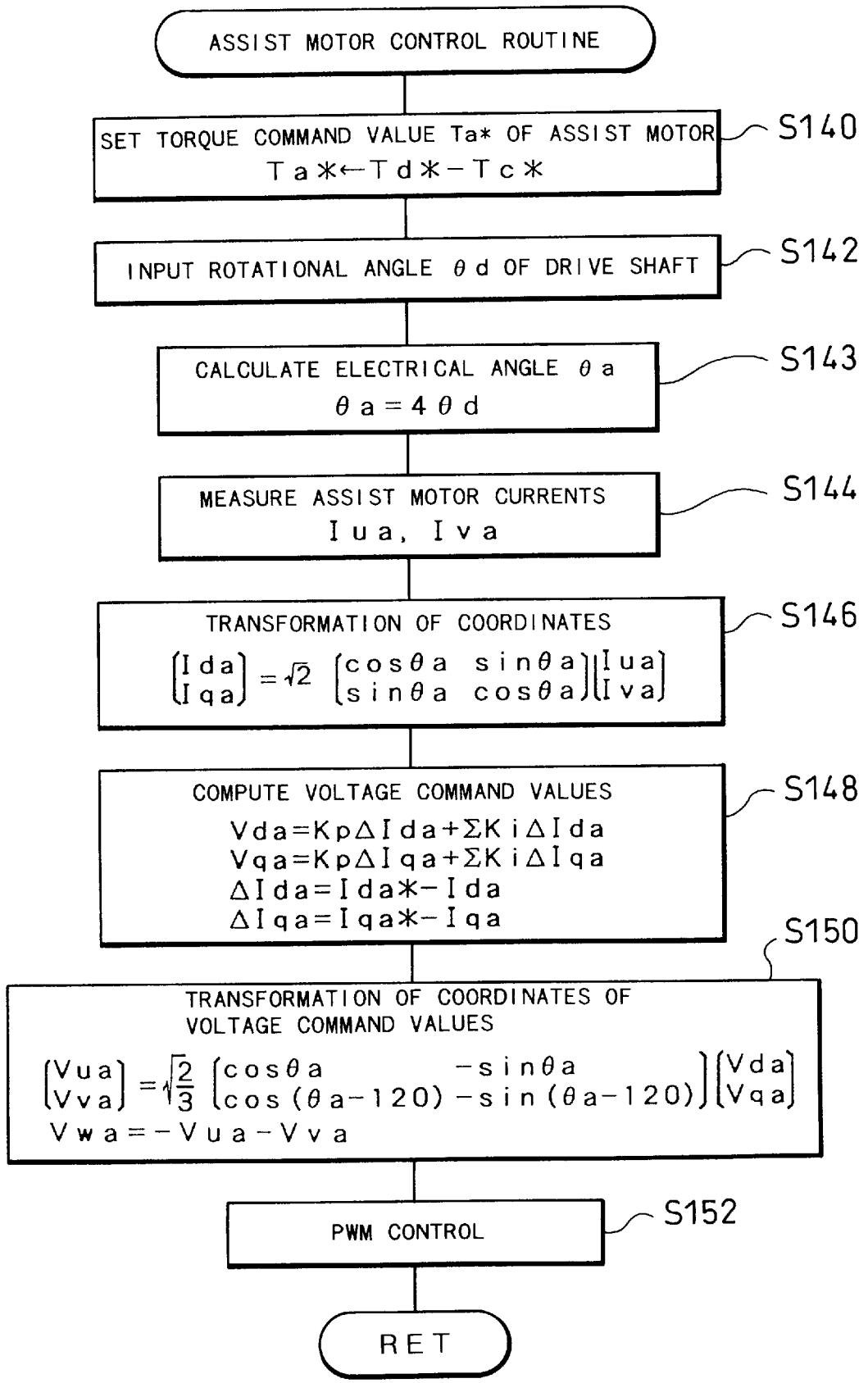
FIG. 6 is a flowchart showing an assist motor control routine executed by the control CPU 90 of the controller 80.

The control procedure of the assist motor 40 executed at step S116 in the flowchart of FIG. 4 follows an assist motor control routine shown in the flowchart of FIG. 6. When the program enters the assist motor control routine, the control CPU 90 of the controller 80 first calculates and sets a torque command value Ta* of the assist motor 40 at step S140 by subtracting the torque command value Tc* of the clutch motor 30, which is set by the clutch motor control routine of FIG. 5, from the output torque command value Td* to be output to the drive shaft 22, which is obtained by the torque control routine of FIG. 4. Setting the torque command value Ta* of the assist motor 40 in this manner enables a torque corresponding to the target torque or torque command value Td* (the torque required by the driver) to be output to the drive shaft. The output torque command value Td* is the sum of the torque command value Tc* of the clutch motor 30 and the torque command value Ta* of the assist motor 40.

The control CPU 90 then reads the rotational angle θd of the drive shaft 22 from the resolver 48 at step S142, and calculates an electrical angle θa of the assist motor 40 from the measured rotational angle θd at step S143. In this embodiment, a synchronous motor having four pairs of poles is used as the assist motor 40, and the electrical angle θa is thus obtained by an equation of θa=4θd. The control CPU 90 then receives data of assist motor currents Iua and Iva at step S144, which respectively flow through the U phase and V phase of the three-phase coils 44 in the assist motor 40 and are measured with the ammeters 97 and 98. The control CPU 90 subsequently executes transformation of coordinates for the electric currents of the three phases at step S146, computes voltage command values Vda and Vqa at step S148, and executes inverse transformation of coordinates for the voltage command values at step S150. At subsequent step S152, the control CPU 90 determines the on- and off-time of the transistors Tr11 through Tr16 in the second driving circuit 92 for PWM (pulse width modulation) control. The processing executed at steps S146 through S152 is similar to that executed at steps S132 through S138 in the clutch motor control routine shown in the flowchart of FIG. 5.

The torque command value Ta* of the assist motor 40 is obtained by subtracting the torque command value Tc* of the clutch motor 30 from the output torque command value Td*. In case that the torque command value Tc* (equal to the target torque Te* of the engine 50) is smaller than the output torque command value Td*, a positive value is set to the torque command value Ta* and the assist motor 40 thereby carries out the power operation. In case that the torque command value Tc* is greater than the output torque command value Td*, on the contrary, a negative value is set to the torque command value Ta* and the assist motor 40 thereby carries out the regenerative operation. Like the control of the clutch motor 30, the assist motor control routine shown in the flowchart of FIG. 6 is applicable to both the power operation and the regenerative operation of the assist motor 40. This is also true when the drive shaft 22 rotates in reverse of the rotation of the crankshaft 56. It is here assumed that the torque command value Ta* of the assist motor 40 is positive when a positive torque is applied to the drive shaft 22 in the direction of rotation of the crankshaft 56.

The control of the engine 50 (step S118 in the flowchart of FIG. 4) is executed in the following manner. In order to enable the engine 50 to be stationarily driven at the driving point defined by the target engine torque Te* and the target engine speed Ne* set at either step S110 or step S112 in the flowchart of FIG. 4, the control CPU 90 regulates the torque Te and the revolving speed Ne of the engine 50. In accordance with a concrete procedure, the control CPU 90 of the controller 80 controls the torque Tc of the clutch motor 30 as the loading torque of the engine 50, while transmitting the target engine torque Te* and the target engine speed Ne* to the EFIECU 70 through communication and enabling the EFIECU 70 to regulate the position of the throttle valve 66, fuel injection from the fuel injection valve 51, and ignition with the ignition plug 62 based on the target engine torque Te* and the target engine speed Ne*. This procedure allows the engine 50 to be driven at the driving point defined by the target torque Te* and the target revolving speed Ne*. Since the output torque Te and the revolving speed Ne of the engine 50 vary with a variation in its loading torque, the control only with the EFIECU 70 does not enable the engine 50 to be driven at the driving point of the target torque Te* and the target revolving speed Ne*. It is accordingly required to control the torque Tc of the clutch motor 30 giving the loading torque. The concrete procedure of controlling the torque Tc of the clutch motor 30 is described previously based on the clutch motor control routine.

When it is determined that the catalytic converter 75 is normal at step S106 in the flowchart of FIG. 4, that is, when the abnormality detection flag F1 is equal to zero, the torque control discussed above converts the power output from the engine 50 and defined by the target engine torque Te* and the target engine speed Ne* to the power defined by the output torque command value Td* and the revolving speed Nd and outputs the converted power to the drive shaft 22. In the first embodiment, only the fundamental operation that converts the power output from the engine 50 and outputs the converted power to the drive shaft 22 is discussed as the operation under the normal condition of the catalytic converter 75. Possible operations other than the fundamental torque conversion may charge the battery 94 with an excess of electrical energy and discharge the battery 94 to supplement the electrical energy. This is implemented by controlling the output energy from the engine 50, the electrical energy regenerated or consumed by the clutch motor 30, and the electrical energy consumed or regenerated by the assist motor 40.

The engine 50 is driven at a possible driving point (that is, the driving point defined by the predetermined torque Terr and the predetermined revolving speed Nerr), irrespective of the effect of the catalytic converter 75. Even when it is determined that the catalytic converter 75 is abnormal at step S106, that is, when the abnormality detection flag F1 is equal to one, this structure accordingly does not worse the emission but protects the environment. Even under the abnormal condition of the catalytic converter 75, the torque corresponding to the torque command value Td* can be output to the drive shaft 22. In case that the energy Pd obtained as the product of the torque command value Td* and the revolving speed Nd of the drive shaft 22 is greater than energy Perr obtained as the product of the predetermined torque Terr and the predetermined revolving speed Nerr, the power output from the engine 50 is insufficient for the required energy. In this state, the insufficiency is supplied by the electrical energy stored in the battery 94. In case that the energy Pd is smaller than the energy Perr, on the contrary, the battery 94 is charged with the excess energy.

Figure 7:
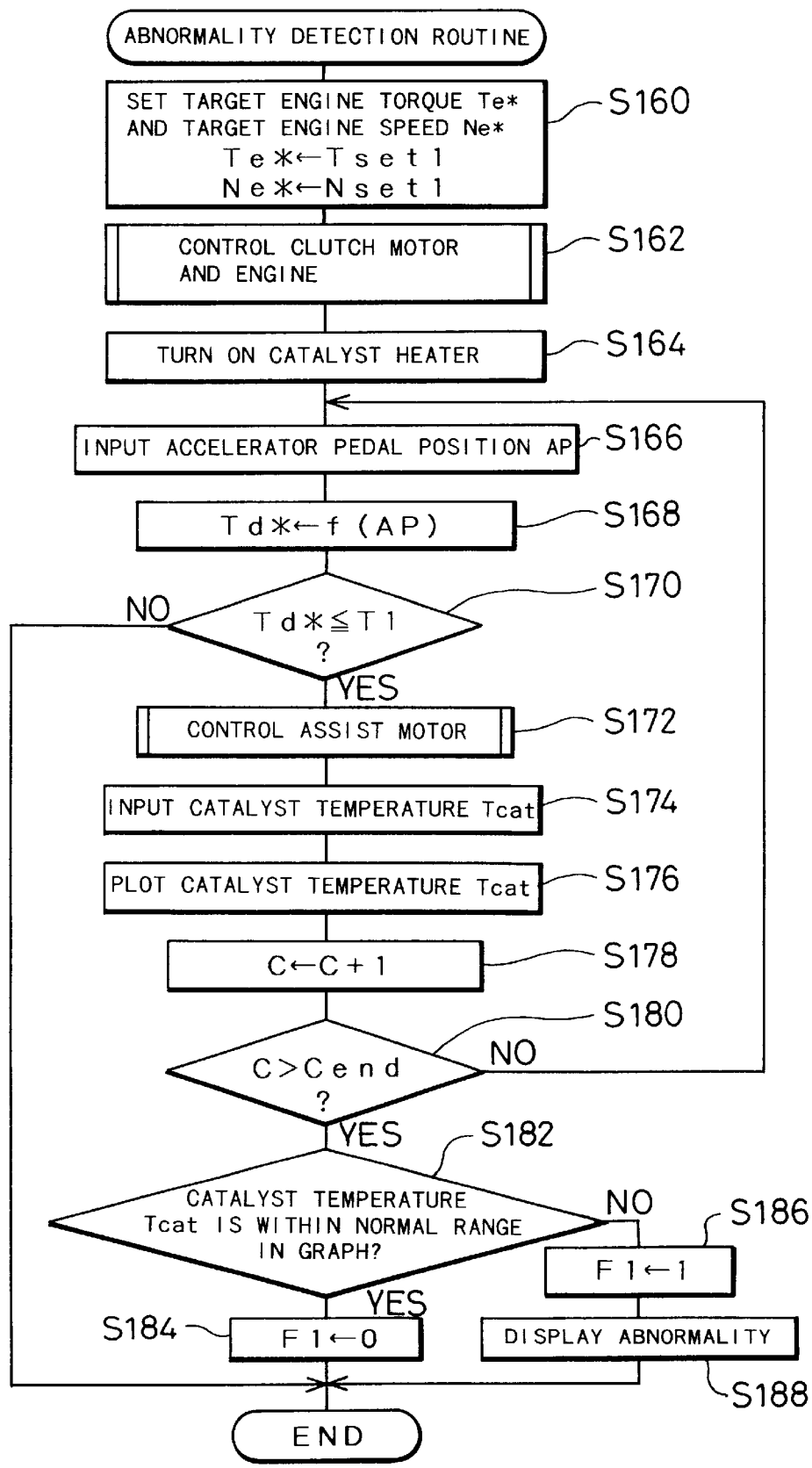
FIG. 7 is a flowchart showing an abnormality detection routine executed by the control CPU 90 of the controller 80 in the first embodiment.

The following describes the operation of checking the three-way catalyst 76 packed in the catalytic converter 75 for deterioration of the catalytic function, based on the abnormality detection routine shown in the flowchart of FIG. 7. This routine is carried out when the engine 50 is under a normal driving condition (that is, when the engine 50 and the three-way catalyst 76 are within a normal operating temperature range) and when the torque command value Td* to be output to the drive shaft 22 based on the input accelerator pedal position AP does not exceed a predetermined threshold value T1 (discussed later) after a predetermined time period, for example, 48 hours, has elapsed or the vehicle has run by a predetermined distance, for example, 300 km, since the previous cycle of this routine.

When the program enters the routine of FIG. 7, the control CPU 90 of the controller 80 first sets a predetermined torque Tset1 and a predetermined revolving speed Nset1 to the target torque Te* and the target revolving speed Ne* of the engine 50 at step S160, and controls the clutch motor 30 and the engine 50, in order to enable the engine 50 to be driven at the preset driving point at step S162. The predetermined torque Tset1 and the predetermined revolving speed Nset1 define the driving point of the engine 50 that is suitable for checking the three-way catalyst 76 for deterioration of the catalytic function, and are set, for example, experimentally in advance and stored in the ROM 90b in this embodiment. Although the control operations of the clutch motor 30 and the engine 50 are shown as steps in this routine for convenience of illustration, these control operations are carried out comprehensively and independently of this routine in the actual state. In the actual procedure, when the target torque Te* and the target revolving speed Ne* of the engine 50 are set at step S160 in the routine of FIG. 7, the control CPU 90 immediately transmits the target values to the EFIECU 70 through communication. The EFIECU 70 then carries out the control of the engine 50, while the control CPU 90 carries out the control of the clutch motor 30 based on the clutch motor control routine shown in the flowchart of FIG. 5.

At subsequent step S164, the control CPU 90 turns on the catalyst heater 77, in order to apply heat to the three-way catalyst 76. The control CPU 90 then reads the accelerator pedal position AP from the accelerator pedal position sensor 64a at step S166, determines the torque command value Td* corresponding to the input accelerator pedal position AP at step S168, and compares the torque command value Td* thus obtained with a predetermined threshold value T1 at step S170. The threshold value T1 is set to be equal to or a little smaller than the sum of the torque output from the engine 50 driven at the driving point specified at step S160 and the maximum torque output from the assist motor 40.

In case that the torque command value Td* is not greater than the threshold value T1, the program proceeds to step S172 to carry out the control of the assist motor 40 (based on the assist motor control routine shown in the flowchart of FIG. 6) with the torque command value Td* and the torque command value Tc* of the clutch motor 30 set by the control of the clutch motor 30 carried out at step S162. Although the control operation of the assist motor 40 is shown as a step in this routine for convenience of illustration, like the control operation of the clutch motor 30, it is carried out comprehensively and independently of this routine. The control CPU 90 subsequently reads a temperature Tcat of the three-way catalyst 76 at step S174, and plots the input temperature Tcat in the graph at step S176. The temperature Tcat of the three-way catalyst 76 is detected, based on a variation in resistance of the catalyst heater 77 by its temperature. Although the observed resistance of the catalyst heater 77 is used for detection of the temperature Tcat in this embodiment, the temperature Tcat may be measured directly by a temperature sensor disposed in the catalytic converter 75. The graph, in which the temperature Tcat is plotted, will be discussed later. After plotting the temperature Tcat, the program increments a counter C at step S178 and determines whether or not the counter C exceeds a terminal value Cend at step S180. In case that the counter C does not exceed the terminal value Cend, the program repeats the processing of steps S166 through S180 and plots the temperature Tcat of the three-way catalyst 76 against an elapse of time. The counter C is initialized to zero by an initialization routine (not shown) when the program carries out this routine. The terminal value Cend represents a preset number of plots (time) of the temperature Tcat, and is set equal to or a little greater than the minimum number of plots (time) of the temperature Tcat, which enable accurate check of the three-way catalyst 76 for deterioration of the catalytic function.

Figure 8:
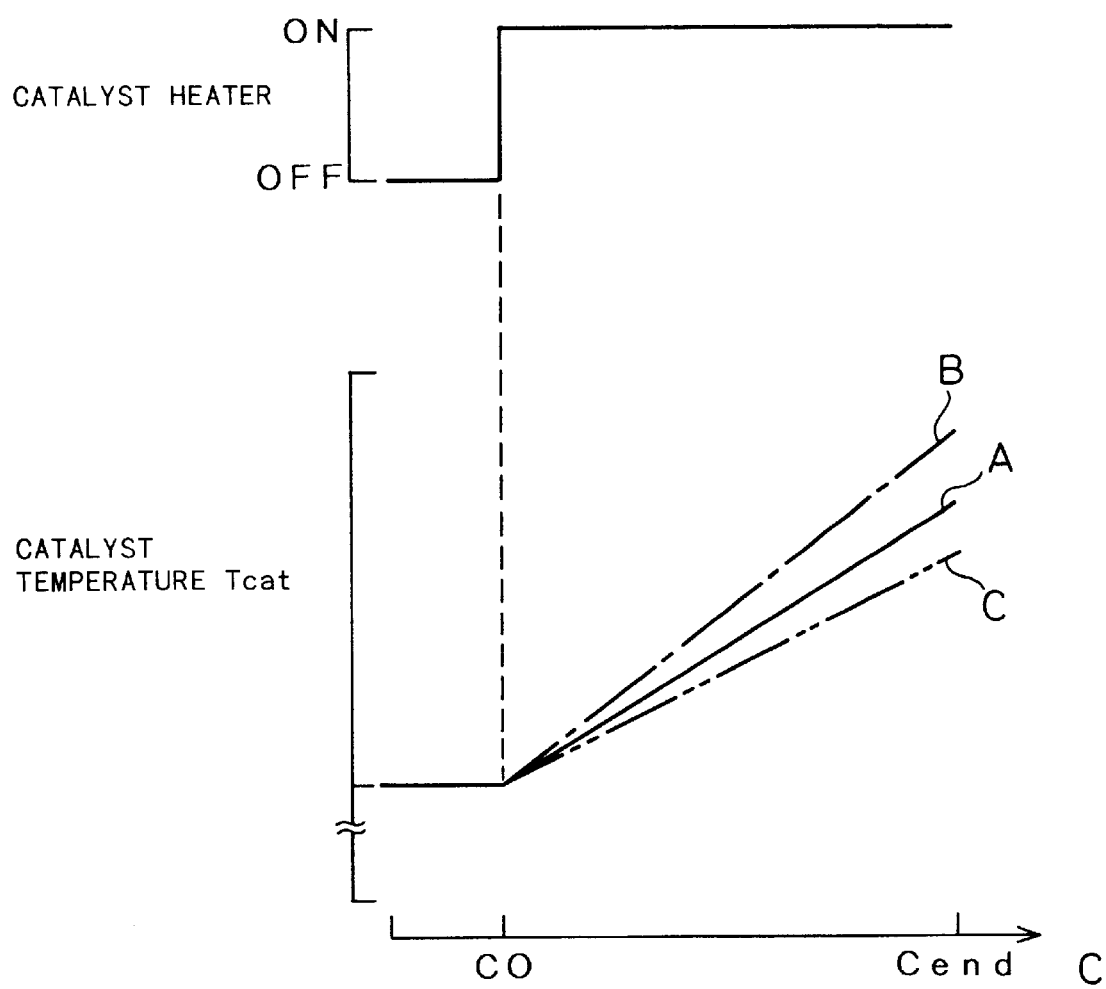
FIG. 8 shows an operation of the catalyst heater 77 for detecting the deteriorating catalytic function of the three-way catalyst 76 and a plot of the temperature Tcat of the three-way catalyst 76 against the elapse of time.

When the counter C exceeds the terminal value Cend, the control CPU 90 reads the graph, in which the temperature Tcat has been plotted, and determines whether or not the variation in temperature Tcat of the three-way catalyst 76 is within a normal range at step S182. FIG. 8 shows the operation of the catalyst heater 77 in the process of checking the three-way catalyst 76 for the deteriorating catalytic function and the plot of the temperature Tcat of the three-way catalyst 76 against the elapse of time. A curve A represents a lower limit of the allowable temperature variation of the three-way catalyst 76 that functions in a normal state when the catalyst heater 77 is turned on while the engine 50 is driven at the predetermined driving point (that is, the driving point defined by the predetermined torque Tset1 and the predetermined revolving speed Nset1). When the plot of the temperature Tcat of the three-way catalyst 76 obtained by this routine is above the curve A as shown by a curve B of one-dot chain line in the graph of FIG. 8, it is determined that the three-way catalyst 76 functions normally (no deterioration of catalytic function). When the plot of the temperature Tcat is below the curve A as shown by a curve C of two-dot chain line in the graph of FIG. 8, on the other hand, it is determined that the three-way catalyst 76 does not function normally (deterioration of catalytic function). The temperature Tcat of the three-way catalyst 76 specifies the normal operation range of the three-way catalyst 76, since the reactions of eliminating carbon monoxide (CO), hydrocarbons (CH), and nitrogen oxides (NOx) from the gaseous exhaust discharged from the engine 50 that is driven at the predetermined driving point are exothermic as a whole.

When it is determined that the plot of the temperature Tcat of the three-way catalyst 76 is within the normal range at step S182, the control CPU 90 sets the abnormality detection flag F1 equal to zero at step S184. When it is determined that the plot of the temperature Tcat is not within the normal range, on the other hand, the control CPU 90 sets the abnormality detection flag F1 equal to one at step S186 and shows existence of abnormality of the catalytic converter 75 (that is, deterioration of the catalytic function of the three-way catalyst 76) on the display 71 at step S188.

In case that the torque command value Td* to be output to the drive shaft 22 is greater than the threshold value T1 at step S170, the program determines that the sum of the torque output via the clutch motor 30 to the drive shaft 22 by the engine 50, which is driven at the predetermined driving point (that is, the driving point defined by the predetermined torque Tset1 and the predetermined revolving speed Nset1), and the torque Ta output from the assist motor 40 to the drive shaft 22 is insufficient for the required torque. The program accordingly stops the processing of checking the three-way catalyst 76 for deterioration of the catalytic function and carries out the torque control routine of FIG. 4.

As discussed above, the abnormality detection routine executed by the power output system 20 of the embodiment enables the engine 50 to be driven under the driving condition suitable for checking the catalytic function of the three-way catalyst 76 (that is, the driving point defined by the predetermined torque Tset1 and the predetermined revolving speed Nset1), during the course of detecting abnormality of the catalytic converter 75, that is, during the course of detecting the deteriorating catalytic function of the three-way catalyst 76. This structure accordingly enables the power output system 20 to realize accurate detection of the deteriorating catalytic function of the three-way catalyst 76. Even during the course of detection, the torque required by the driver can be output to the drive shaft 22 by regulating the torque Ta of the assist motor 40. In response to a detection of the deteriorating three-way catalyst 76, information regarding the abnormality of the catalytic converter 75 is shown on the display 71. This informs the driver of deterioration of the three-way catalyst 76 without delay. When the driver requires a large torque in the process of detection, the program immediately stops the detection and carries out the processing, for example, the torque control routine of FIG. 4, in order to enable the torque required by the driver to be output to the drive shaft 22.

The power output system 20 of the embodiment can freely set the frequency of the check of the three-way catalyst 76 for deterioration of catalytic function; for example, at the time when a predetermined time period has elapsed or the vehicle has run by a predetermined distance since the previous cycle of this routine. This structure effectively prevents the problem of the conventional system, that is, the deteriorating three-way catalyst 76 may be left for a relatively long time.

The power output system 20 of the embodiment turns on the catalyst heater 77 while the engine 50 is driven at the predetermined driving point, and determines whether or not the temperature change of the three-way catalyst 76 is within a normal range, in order to detect the deteriorating catalytic function of the three-way catalyst 76. One modified application varies the driving point of the engine 50 at predetermined time intervals, and determines whether or not the temperature change of the three-way catalyst 76 is within a normal range, in order to detect the deteriorating catalytic function of the three-way catalyst 76. The flowchart of FIG. 9 shows another abnormality detection routine based on this modified application.

Figure 9:
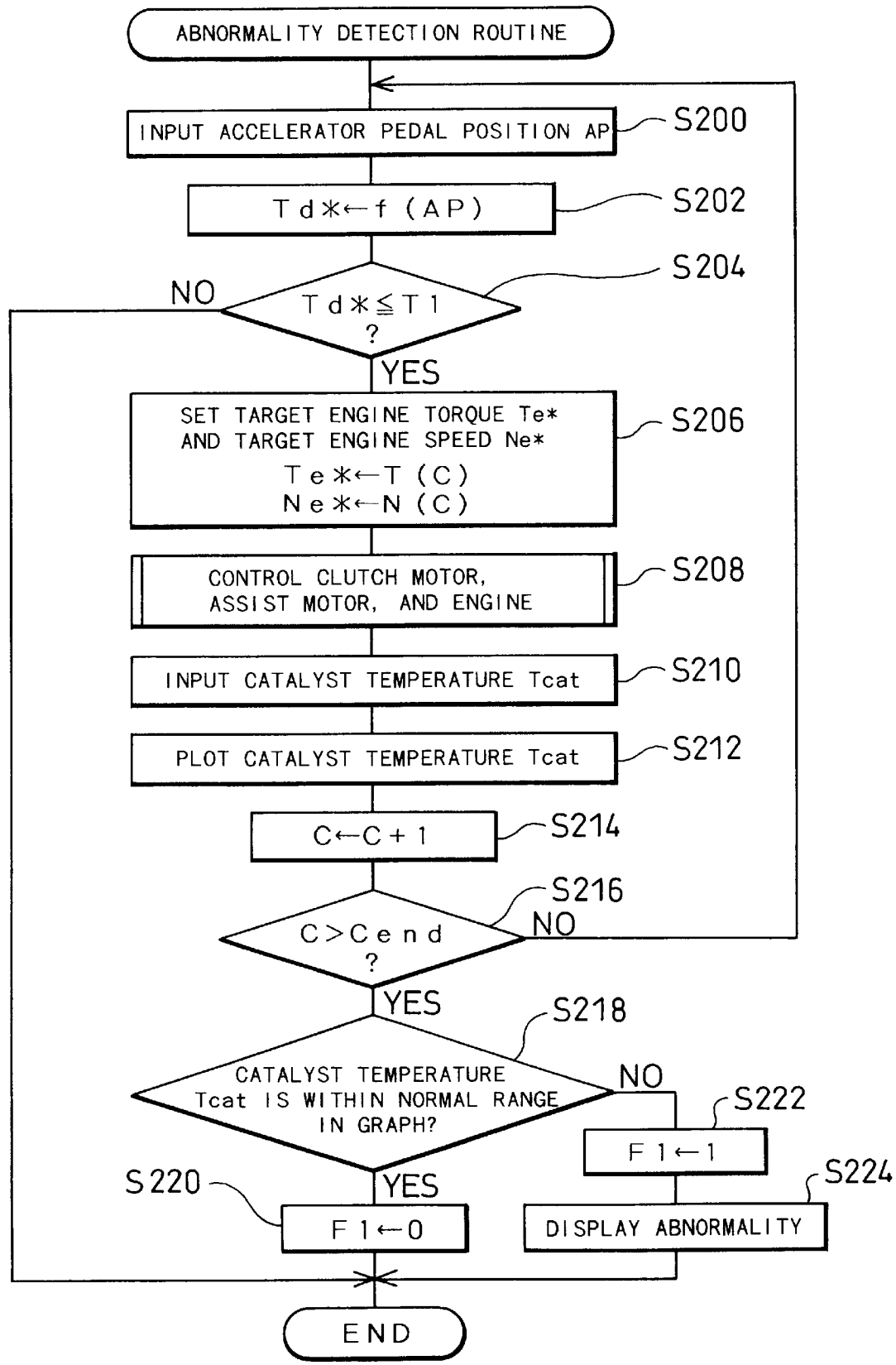
FIG. 9 is a flowchart showing a modified abnormality detection routine.

When the program enters the routine of FIG. 9, the control CPU 90 of the controller 80 first reads the accelerator pedal position AP at step S200 and determines the torque command value Td* to be output to the drive shaft 22 corresponding to the input accelerator pedal position AP at step S202. The torque command value Td* thus obtained is then compared with a threshold value T1 at step S204. In case that the torque command value Td* exceeds the threshold value T1, the program immediately exits from this routine. The processing of steps S200 through S204 is identical with the processing of steps S166 through S170 in the abnormality detection routine of FIG. 7. In case that the torque command value Td* is not greater than the threshold value T1, on the other hand, values depending upon the counter C are set to the target torque Te* and the target revolving speed Ne* of the engine 50 at step S206. In this modified structure, a map representing the relationship between the counter C, the target engine torque Te*, and the target engine speed Ne* is set in advance and stored in the ROM 90b. In accordance with a concrete procedure, at step S206, the control CPU 90 reads the target engine torque Te* and the target engine speed Ne* corresponding to the counter C from the map. By way of example, a fixed value is set to the target engine torque Te* regardless of the counter C, whereas a value varying with an increase in counter C, like the revolving speed Ne of the engine Ne plotted against the counter C in the graph of FIG. 10, is set to the target engine speed Ne*.

The program carries out the control operations of the clutch motor 30, the assist motor 40, and the engine 50 based on the preset target engine torque Te* and the target engine speed Ne* at step S208. The program subsequently carries out the processing of steps S210 through S224, which is identical with the processing of steps S174 through S188 in the abnormality detection routine of FIG. 7.

Figure 10:
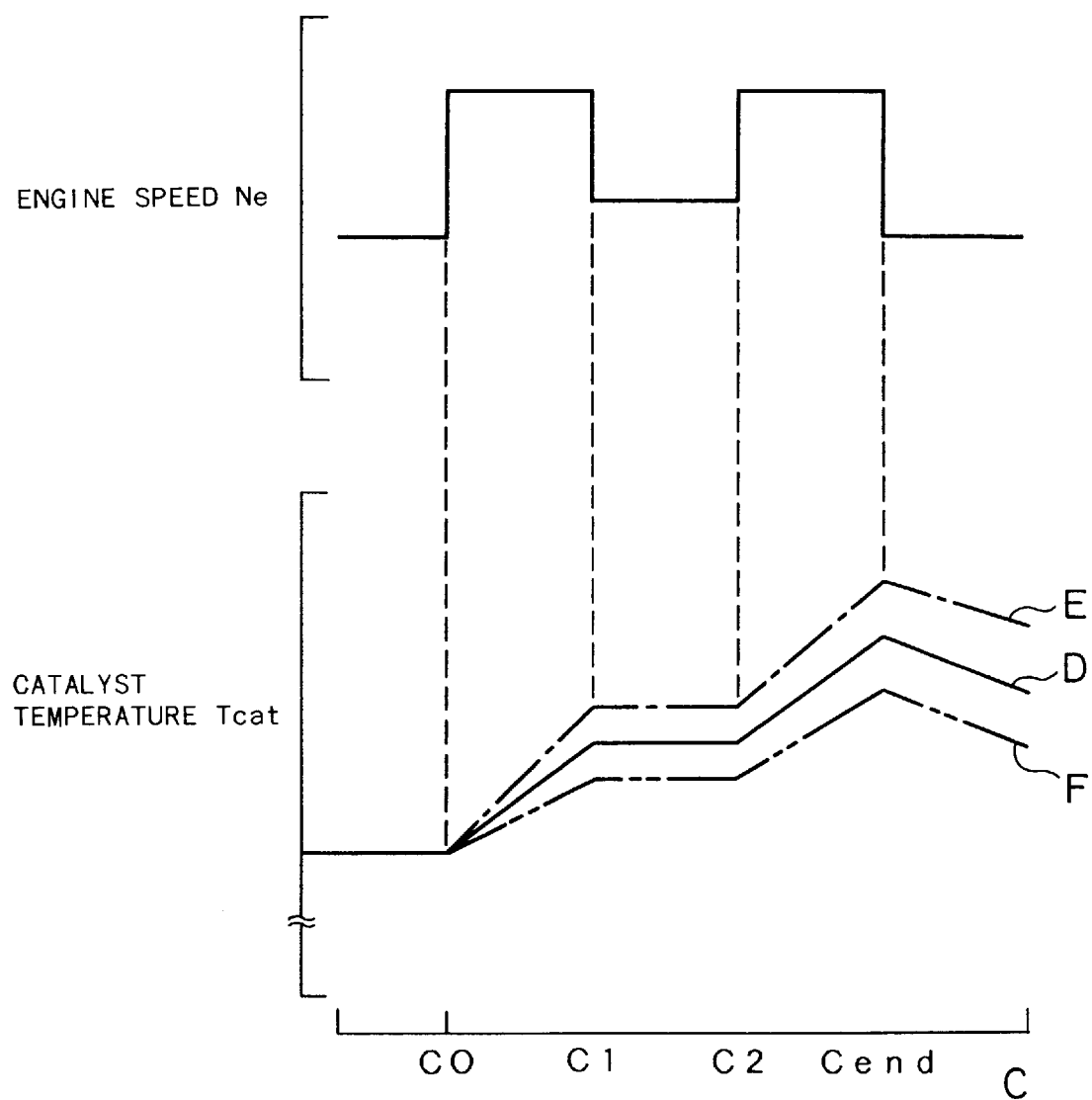
FIG. 10 shows a variation in revolving speed Ne of the engine 50 and a plot of the temperature Tcat of the three-way catalyst 76 against the elapse of time when the modified abnormality detection routine is carried out.

FIG. 10 shows the variation in revolving speed Ne of the engine 50 in the process of checking the three-way catalyst 76 for the deteriorating catalytic function and the plot of the temperature Tcat of the three-way catalyst 76 against the elapse of time. A curve D represents a lower limit of the allowable temperature variation of the three-way catalyst 76 that functions in a normal state when the engine 50 is driven at the driving point varying with an increase in counter C. When the plot of the temperature Tcat of the three-way catalyst 76 obtained by the modified routine is above the curve D as shown by a curve E of one-dot chain line in the graph of FIG. 10, it is determined that the three-way catalyst 76 functions normally (no deterioration of catalytic function). When the plot of the temperature Tcat is below the curve D as shown by a curve F of two-dot chain line in the graph of FIG. 10, on the other hand, it is determined that the three-way catalyst 76 does not function normally (deterioration of catalytic function).

As discussed above, the power output system 20 of the embodiment carries out the abnormality detection routine of FIG. 9, in order to detect the deteriorating catalytic function of the three-way catalyst 76 based on the temperature Tcat of the three-way catalyst 76 varying with a variation in driving point of the engine 50.

The conventional technique is also applicable to detect the deteriorating catalytic function of the three-way catalyst 76. While the engine 50 is driven under the driving condition suitable for checking of the three-way catalyst 76 for deterioration of the catalytic function, the amount of fuel injection is alternately increased and decreased at predetermined time intervals by 4 to 10% around the mean value in this state. This method then accumulates the area (time) of the oxygen-rich signals detected by the oxygen sensor 78a and the sub-oxygen sensor 78b disposed before and after the catalytic converter 75, and detects the deteriorating catalytic function of the three-way catalyst 76 based on the difference. The structure of the embodiment allows the driving point of the engine 50 as well as the frequency of detection to be set freely. This structure thus enhances the accuracy of detection by setting the driving point of the engine 50 suitable for checking the three-way catalyst 76 for deterioration and effectively prevents the problem of the conventional system, that is, the deteriorating three-way catalyst 76 may be left for a relatively long time.

Figure 11:
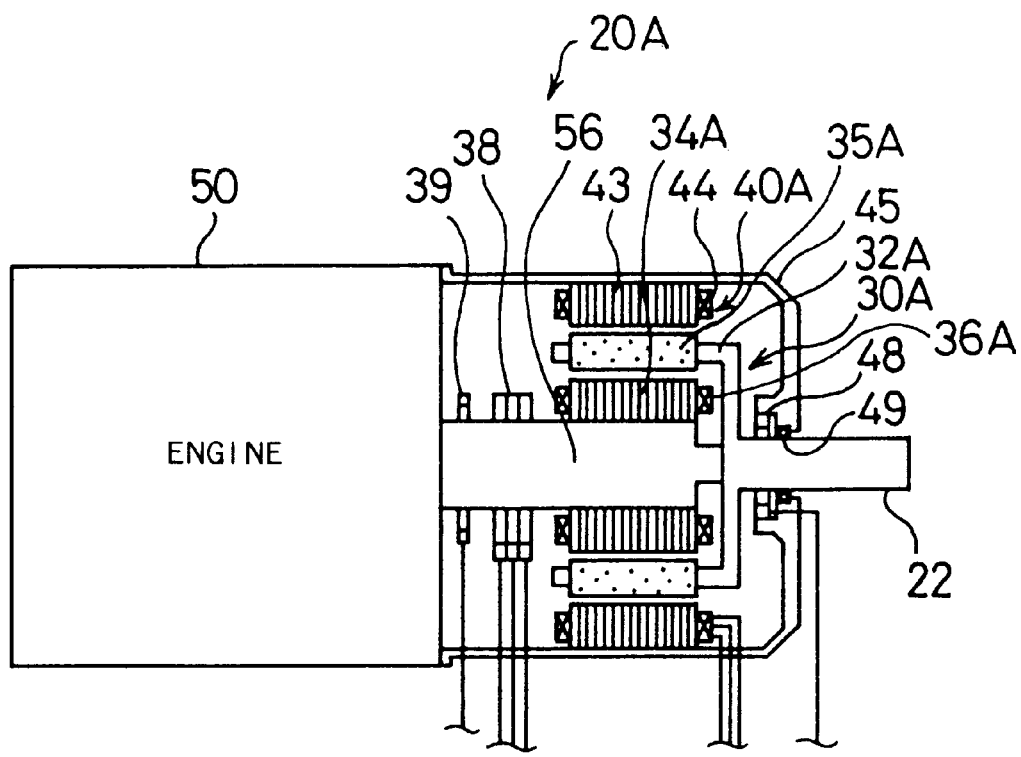
FIG. 11 schematically illustrates structure of a power output system 20A as a modified example.

In the structure of the power output system 20 of the embodiment discussed above, the clutch motor 30 and the assist motor 40 are separately attached to the different positions of the drive shaft 22. Like another power output system 20A illustrated in FIG. 11 as a modified example, however, the clutch motor and the assist motor may be joined integrally with each other. A clutch motor 30A of the power output system 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. A non-magnetic member (not shown) is interposed between the magnetic pole on the outer surface and the magnetic pole on the inner surface in the permanent magnets 35A. An assist motor 40A includes the outer rotor 32A of the clutch motor 30A and a stator 43 with three-phase coils 44 mounted thereon. In this structure, the outer rotor 32A of the clutch motor 30A also works as the rotor of the assist motor 40A. Since the three-phase coils 36A are mounted on the inner rotor 34A linked with the crankshaft 56, the slip ring 38 for supplying electric power to the three-phase coils 36A of the clutch motor 30A is attached to the crankshaft 56.

In the power output system 20A of this modified structure, the voltage applied to the three-phase coils 36A on the inner rotor 34A is controlled against the inner-surface magnetic pole of the permanent magnets 35A set on the outer rotor 32A. This enables the clutch motor 30A to work in the same manner as the clutch motor 30 of the power output system 20 of the embodiment having the clutch motor 30 and the assist motor 40 separately attached to the drive shaft 22. The voltage applied to the three-phase coils 44 on the stator 43 is controlled against the outer-surface magnetic pole of the permanent magnets 35A set on the outer rotor 32A. This enables the assist motor 40A to work in the same manner as the assist motor 40 of the power output system 20. The power output system 20A of the modified structure accordingly works in the same manner as the power output system 20 of the embodiment.

The outer rotor 32A functions concurrently as one of the rotors in the clutch motor 30A and as the rotor of the assist motor 40A, thereby effectively reducing the size and weight of the power output system 20A.

In the power output system 20 of the embodiment, the slip ring 38 consisting of the rotary rings 38a and the brushes 38b is used as the transmission means of the electric power to the clutch motor 30. The slip ring 38 may, however, be replaced by a rotary ring-mercury contact, a semiconductor coupling of magnetic energy, a rotary transformer, or the like.

Figure 12:
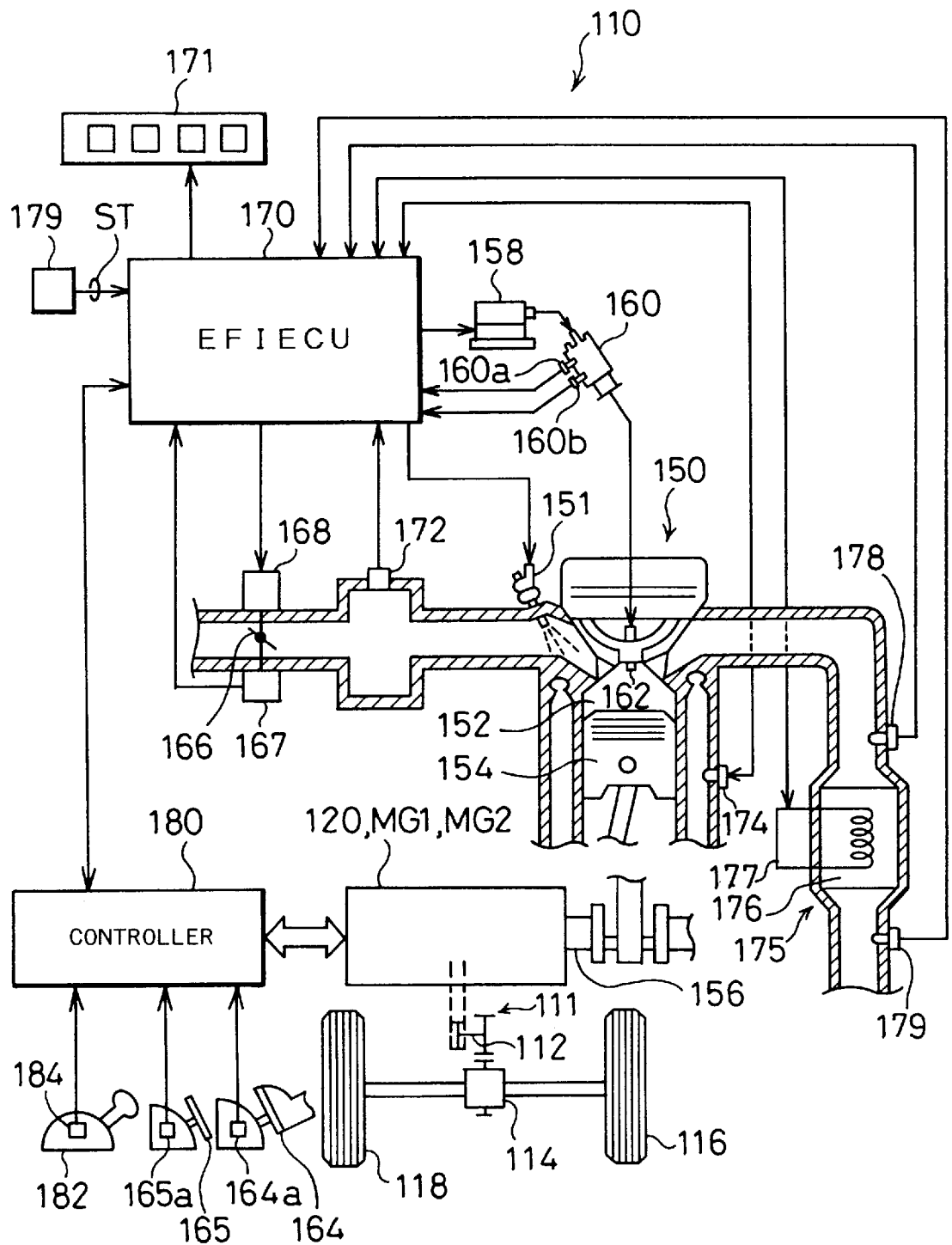
FIG. 12 schematically illustrates structure of a vehicle with a power output system 110 incorporated therein and having an abnormality detection apparatus for detecting abnormality of a three-way catalyst 176 packed in a catalytic converter 175 as a second embodiment according to the present invention.
Figure 13:
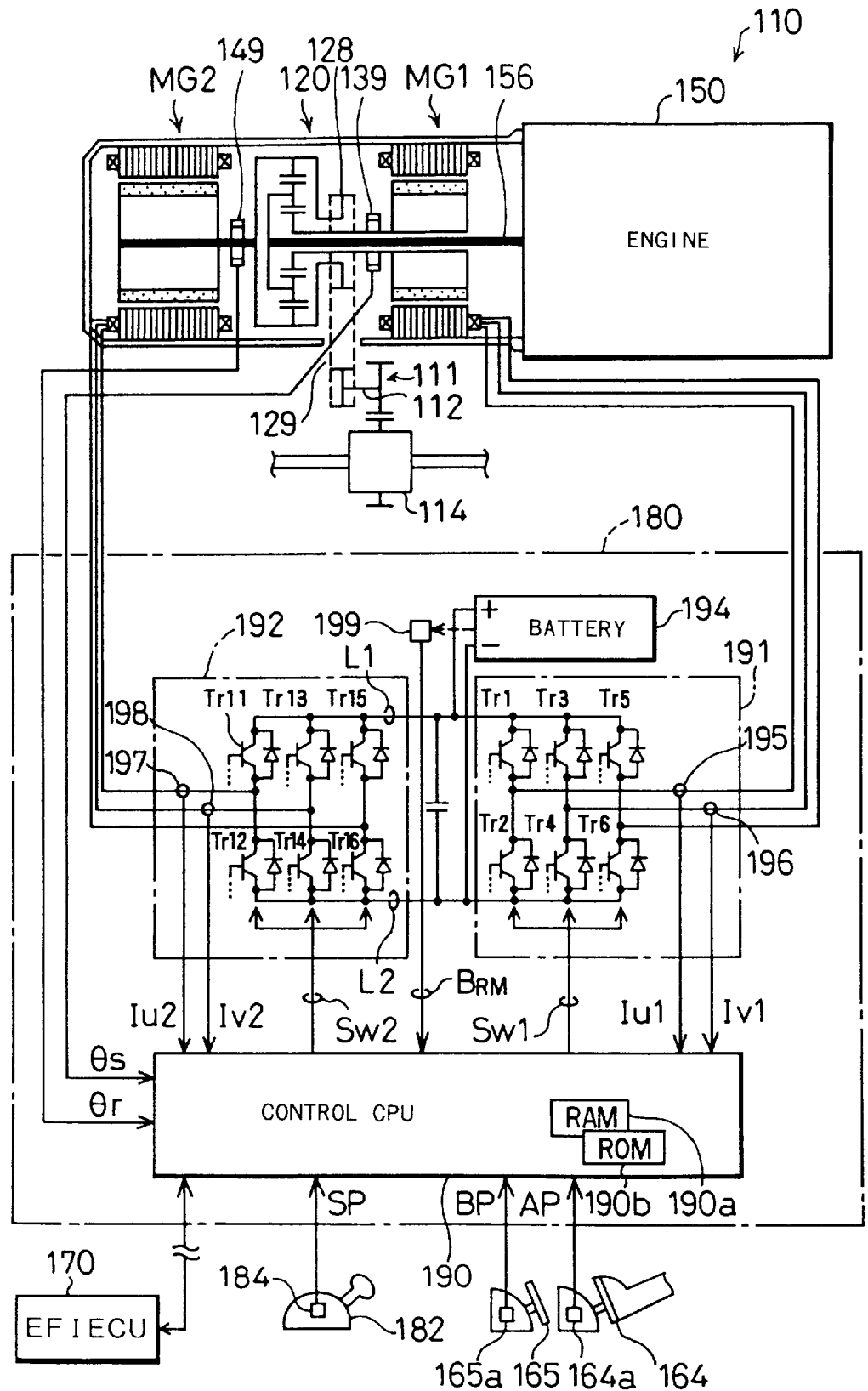
FIG. 13 schematically shows structure of the power output system 110 of the second embodiment.

The following describes another power output system 110 having an abnormality detection apparatus of a three-way catalyst 176 packed in a catalytic converter 175 as a second embodiment according to the present invention. FIG. 12 schematically illustrates structure of a vehicle with the power output system 110 of the second embodiment incorporated therein. FIG. 13 schematically shows structure of the power output system 110 of the second embodiment, and FIG. 14 is an enlarged view illustrating part of the power output system 110 of the second embodiment.

The vehicle with the power output system 110 of the second embodiment shown in FIG. 12 has a similar structure to that of the vehicle with the power output system 20 of the first embodiment shown in FIG. 1, except that the clutch motor 30 and the assist motor 40 attached to the crankshaft 56 are replaced by a planetary gear 120, a first motor MG1, and a second motor MG2 attached to a crankshaft 156. The constituents of the power output system 110 of the second embodiment that are identical with those of the power output system 20 of the first embodiment are shown by like numerals +100 and not specifically described here. The numerals and symbols used in the description of the power output system 20 of the first embodiment have the same meanings in the description of the power output system 110 of the second embodiment, unless otherwise specified.

Referring to FIG. 13, the power output system 110 of the second embodiment primarily includes an engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and a controller 180 for driving and controlling the first and the second motors MG1 and MG2.

Figure 14:
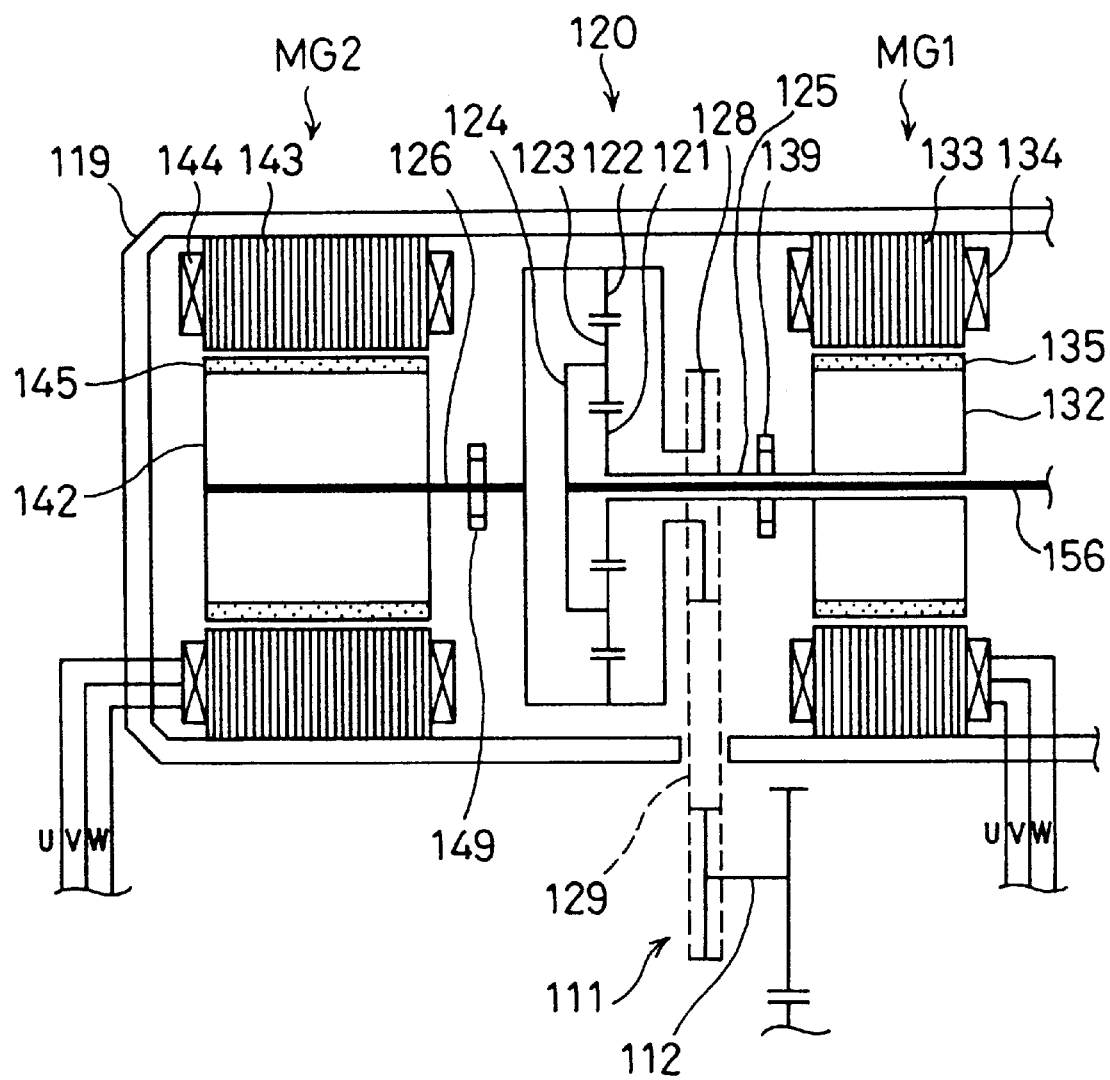
FIG. 14 is an enlarged view illustrating part of the power output system 110 of the second embodiment.

As shown in FIG. 14, the planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111. As shown in FIG. 12, the power transmission gear 111 is further linked with a differential gear 114, so that the power output from the power output system 110 is eventually transmitted to left and right driving wheels 116 and 118.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

Referring back to FIG. 13, the controller 180 included in the power output system 110 of the second embodiment is constructed like the controller 80 included in the power output system 20 of the first embodiment. The controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 includes a RAM 190a used as a working memory, a ROM 190b in which various control programs are stored, an input/output port (not shown), and a serial communication port (not shown) through which data are sent to and received from an EFIECU 170. The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of the accelerator pedal 164) output from an accelerator position sensor 164a, a brake pedal position BP (step-on amount of the brake pedal 165) output from a brake pedal position sensor 165a, a gearshift position SP output from a gearshift position sensor 184, electric currents Iu1 and Iv1 from two ammeters 195 and 196 disposed in the first driving circuit 191, electric currents Iu2 and Iv2 from two ammeters 197 and 198 disposed in the second driving circuit 192, and a remaining charge BRM of the battery 194 measured with a remaining charge meter 199.

Figure 15:
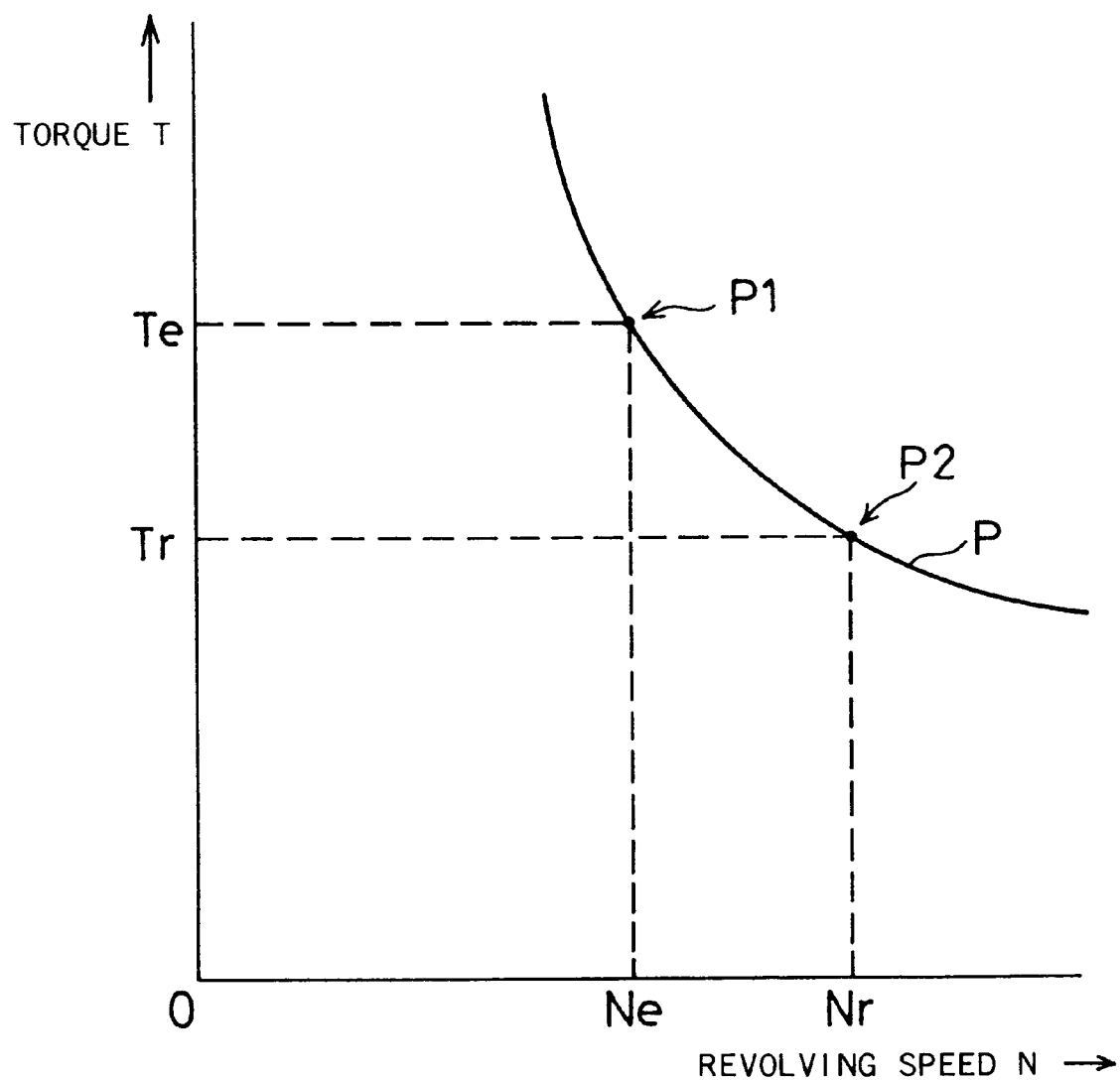
FIG. 15 is a graph showing the operation principle of the power output system 110 of the second embodiment.

The power output system 110 of the second embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to the torque conversion and applied to the ring gear shaft 126. The relationship between the torque and the revolving speed of the engine 150 and the ring gear shaft 126 under such conditions is shown in the graph of FIG. 15.

Figure 16:
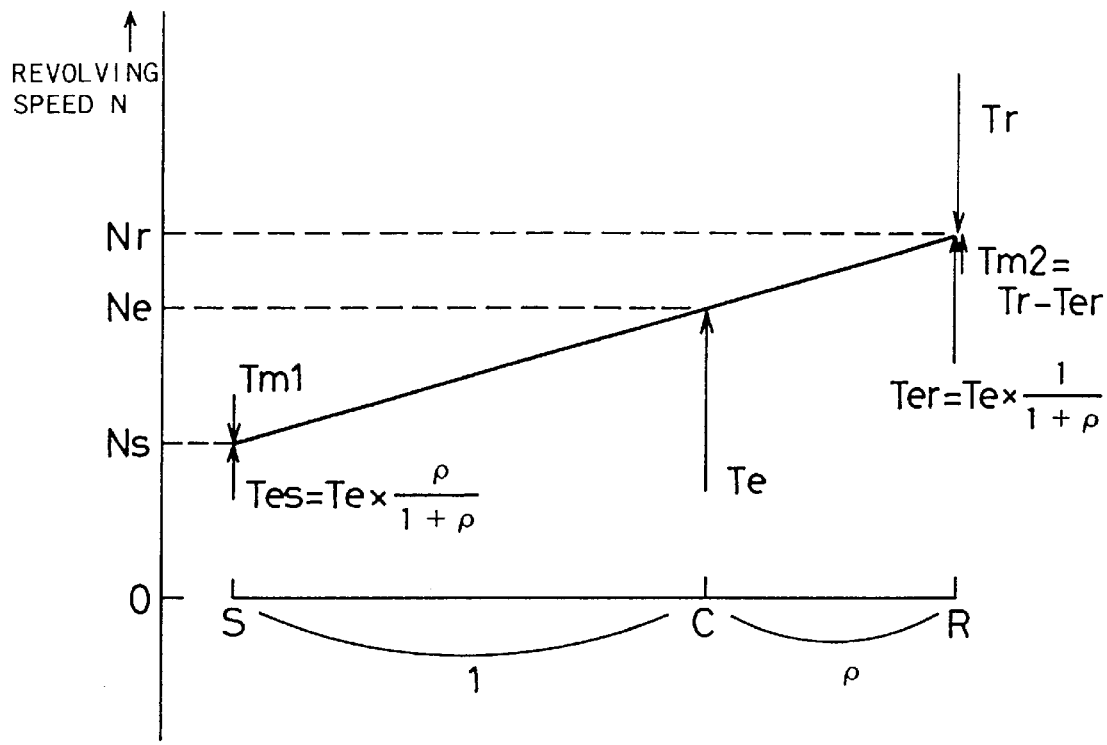
FIG. 16 is a nomogram showing the relationship between the revolving speed and the torque on the three shafts linked with the planetary gear 120 in the power output system 110 of the second embodiment.
Figure 17:
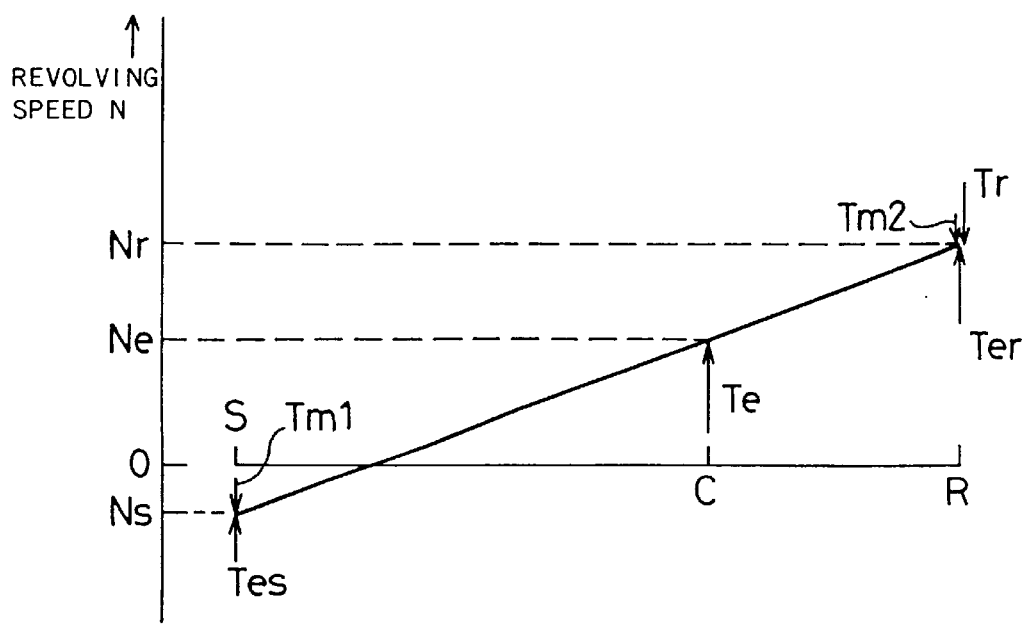
FIG. 17 is a nomogram showing the relationship between the revolving speed and the torque on the three shafts linked with the planetary gear 120 in the power output system 110 of the second embodiment.

According to the mechanics, the relationship between the revolving speed and the torque of the three shafts in the planetary gear 120 (that is, the sun gear shaft 125, the ring gear shaft 126, and the planetary carrier 124 (crankshaft 156)) can be expressed as nomograms illustrated in FIGS. 16 and 17 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 16, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the sun gear 121 to the number of teeth of the ring gear 122 and expressed as Equation (6) given below:

$$\rho = \frac{\text{the number of teeth of the sun gear}}{\text{the number of teeth of the ring gear}} \qquad (6)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (7) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \qquad (7)$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The magnitudes of the torques Tes and Ter are given by Equations (8) and (9) below:

$$Tes = Te \times \frac{\rho}{1+\rho} \quad (8)$$

$$Ter = Te \times \frac{1}{1+\rho} \quad (9)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 15, the power that is expressed as the product of the torque Te and the revolving speed Ne and output from the engine 150 driven at the driving point P1 is subjected to the torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 16, it may be negative according to the revolving speed Ne of the engine 150 and the revolving speed Nr of the ring gear shaft 126 as shown in the nomogram of FIG. 17. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

The above description refers to the fundamental torque conversion in the power output system 110 of the second embodiment. The power output system 110 can, however, perform other operations as well as the above fundamental operation that carries out the torque conversion for all the power output from the engine 150 and outputs the converted torque to the ring gear shaft 126. The possible operations include an operation of charging the battery 194 with the surplus electrical energy and an operation of supplementing an insufficient electrical energy with the electric power stored in the battery 194. These operations are implemented by regulating the power output from the engine 150 (that is, the product of the torque Te and the revolving speed Ne), the electrical energy Pm1 regenerated or consumed by the first motor MG1, and the electrical energy Pm2 regenerated or consumed by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 16, the torque Tm2 of the second motor MG2 may be calculated by multiplying the electric power regenerated by the first motor MG1 by the efficiencies of both the motors MG1 and MG2. In the state of the nomogram of FIG. 17, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

The power output system 110 of the second embodiment controls the first motor MG1 and the second motor MG2, in order to convert the power output from the engine 150 and output the converted power to the ring gear shaft 126. Although the planetary gear 120 has the gear ratio, the planetary gear 120 and the first motor MG1 in the power output system 110 of the second embodiment function like the clutch motor 30 in the power output system 20 of the first embodiment, and the second motor MG2 like the assist motor 40. The power output system 110 of the second embodiment controls the first motor MG1 and the second motor MG2 by considering the gear ratio of the planetary gear 120, so as to carry out all the control procedures executed by the power output system 20 of the first embodiment. Namely the power output system 110 of the second embodiment can execute the basic torque control routine of FIG. 4 as well as any one of the abnormality detection routine of FIG. 7, the modified abnormality detection routine of FIG. 9, and the conventional procedure with the oxygen sensor 78a and the sub-oxygen sensor 78b disposed before and after the catalytic converter 75, for checking the three-way catalyst 76 for deterioration of the catalytic function. The following describes the basic torque control carried out by the power output system 110 of the second embodiment, based on a torque control routine shown in the flowchart of FIG. 18, which corresponds to the torque control routine of FIG. 4 carried out by the power output system 20 of the first embodiment. The operation of detecting the deteriorating catalytic function of the three-way catalyst 176 is then described, based on an abnormality detection routine shown in the flowchart of FIG. 21, which corresponds to the abnormality detection routine of FIG. 9 carried out by the power output system 20 of the first embodiment.

Figure 18:
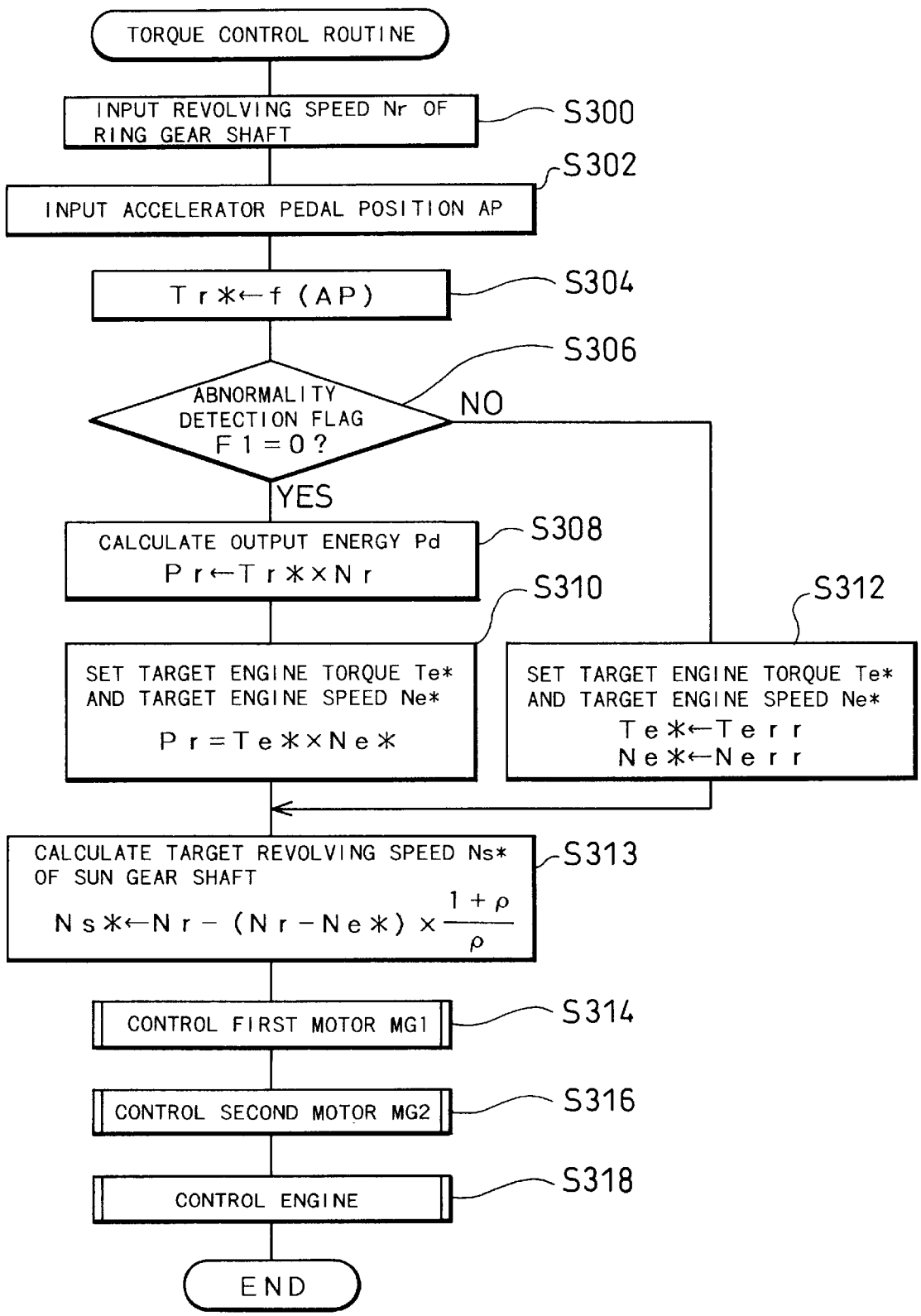
FIG. 18 is a flowchart showing an abnormality detection routine executed by the control CPU 190 of the controller 180 in the second embodiment.

When the program enters the torque control routine of FIG. 18, the control CPU 190 of the controller 180 in the power output system 110 of the second embodiment first reads the revolving speed Nr of the ring gear shaft 126 at step S300. The revolving speed Nr of the ring gear shaft 126 may be calculated from the rotational angle θr of the ring gear shaft 126 measured by the resolver 149 attached to the ring gear shaft 126. The control CPU 190 then reads the accelerator pedal position AP detected by the accelerator pedal position sensor 164a at step S302, and determines a torque command value Tr* or a target torque to be output to the ring gear shaft 126 according to the input accelerator pedal position AP at step S304. Not the torque to be output to the driving wheels 116 and 118 but the torque to be output to the ring gear shaft 126 is determined here based on the accelerator pedal position AP. This is because the ring gear shaft 126 is mechanically linked with the driving wheels 116 and 118 via the power feed gear 128, the power transmission gear 111, and the differential gear 114. The determination of the torque to be output to the ring gear shaft 126 accordingly results in determining the torque to be output to the driving wheels 116 and 118. In the second embodiment, a map representing the relationship between the accelerator pedal position AP and the torque command value Tr* is prepared in advance and stored in the ROM 190b. In accordance with a concrete procedure, at step S304, the control CPU 190 reads the torque command value Tr* corresponding to the input accelerator pedal position AP from the map stored in the ROM 190b.

The program then carries out the processing of steps S306 through S312 to set the target torque Te* and the target revolving speed Ne* of the engine 150 according to the value of the abnormality detection flag F1. This processing is similar to the processing of steps S106 through S112 in the torque control routine of FIG. 4. In the second embodiment, the energy Pe to be output from the engine 150 is given as the energy Pr to be output to the ring gear shaft 126 and calculated as the product of the torque command value Tr* and the revolving speed Nr of the ring gear shaft 126.

The control CPU 190 substitutes the target revolving speed Ne* of the engine 150 for the observed revolving speed Ne of the engine 150 in Equation (7) given above, so as to calculate a target revolving speed Ns* of the sun gear shaft 125 at step S313. The program then carries out the control operations of the first motor MG1, the second motor MG2, and the engine 150 at steps S314 through S318, based on the target torque Te* and the target revolving speed Ne* of the engine 150 and the target revolving speed Ns* of the sun gear shaft 125 thus specified. In the second embodiment, for convenience of illustration, the control operations of the first motor MG1, the second motor MG2, and the engine 150 are shown as steps in the torque control routine. In the actual procedure, however, these control operations are carried out comprehensively and independently of this routine. The control operation of the engine 150 is identical with the control operation of the engine 50 in the first embodiment and thus not specifically described here.

Figure 19:
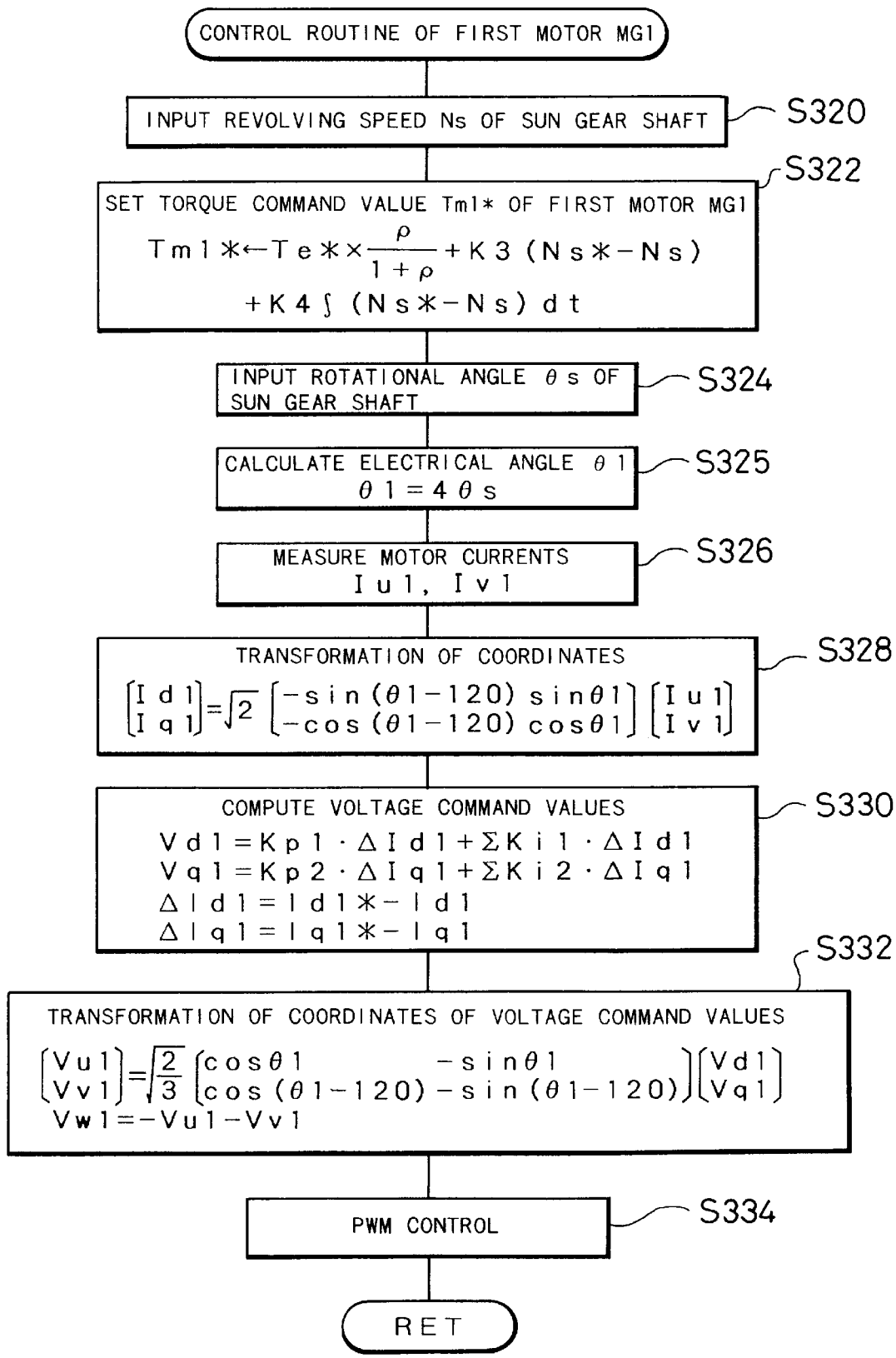
FIG. 19 is a flowchart showing a control routine of the first motor MG1 executed by the control CPU 190 of the controller 180.

The control operation of the first motor MG1 (step S314 in the flowchart of FIG. 18) follows a control routine of the first motor MG1 shown in the flowchart of FIG. 19. When the program enters the routine of FIG. 19, the control CPU 190 of the controller 180 first reads the revolving speed Ns of the sun gear shaft 125 at step S320. The revolving speed Ns of the sun gear shaft 125 may be calculated from the rotational angle θs of the sun gear shaft 125 measured by the resolver 139 attached to the sun gear shaft 125. At subsequent step S322, the control CPU 190 calculates a torque command value Tm1* of the first motor MG1 from the input revolving speed Ns of the sun gear shaft 125 and the target torque Te* of the engine 150 and the target revolving speed Ns* of the sun gear shaft 125 specified in the torque control routine of FIG. 18 according to Equation (10) given below. The first term on the right side of Equation (10) is obtained from the equilibrium on the dynamic collinear line shown in the nomograms of FIGS. 16 and 17. The second term on the right side is a proportional term to cancel the deviation of the observed revolving speed Ns from the target revolving speed Ns*, and the third term on the right side is an integral term to cancel the stationary deviation. In the stationary state (that is, when the deviation of the observed revolving speed Ns from the target revolving speed Ns* is equal to zero), the torque command value Tm1* of the first motor MG1 is set equal to the first term on the right side obtained from the equilibrium on the dynamic collinear line. K3 and K4 in Equation (10) denote proportional constants.

$$Tm1^* \leftarrow Te^* \times \frac{\rho}{1+\rho} + K3(Ns^* - Ns) + K4 \int (Ns^* - Ns) dt \quad (10)$$

After setting the torque command value Tm1* of the first motor MG1, the program carries out the processing of steps S324 through S334, which is similar to the processing of steps S142 through S152 in the assist motor control routine of FIG. 6 and thus not specifically described here.

Figure 20:
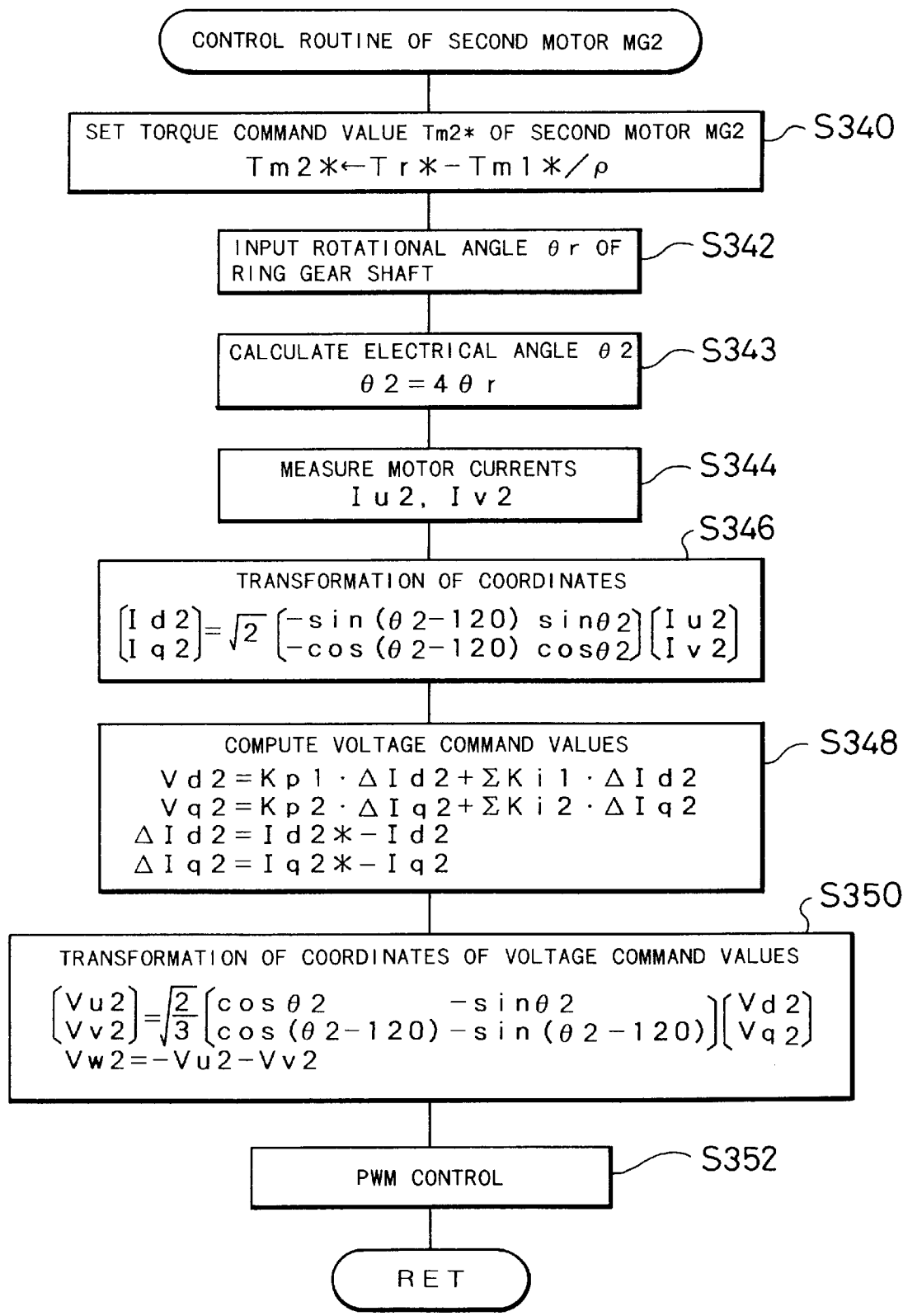
FIG. 20 is a flowchart showing a control routine of the second motor MG2 executed by the control CPU 190 of the controller 180.

The control operation of the second motor MG2 (step S316 in the flowchart of FIG. 18) follows a control routine of the second motor MG2 shown in the flowchart of FIG. 20. When the program enters the routine of FIG. 20, the control CPU 190 of the controller 180 first calculates a torque command value T2* of the second motor MG2 from the torque command value Tr* to be output to the ring gear shaft 126 and the torque command value Tm1* of the first motor MG1 according to Equation (11) given below at step S340. The second term on the right side of Equation (11) represents the torque output to the ring gear shaft 126 via the planetary gear 120, while the first motor MG1 outputs the torque corresponding to the torque command value Tm1* to the sun gear shaft 125.

$$Tm2^* \leftarrow Tr^* - \frac{Tm1^*}{\rho} \qquad (11)$$

After setting the torque command value Tm2* of the second motor MG2, the program carries out the processing of steps S342 through S352, which is similar to the processing of steps S142 through S152 in the assist motor control routine of FIG. 6.

When it is determined that the catalytic converter 175 is normal at step S306 in the flowchart of FIG. 18, that is, when the abnormality detection flag F1 is equal to zero, the torque control discussed above converts the power output from the engine 150 and defined by the target engine torque Te* and the target engine speed Ne* to the power defined by the output torque command value Tr* and the revolving speed Nr and outputs the converted power to the ring gear shaft 126. In the second embodiment, only the fundamental operation that converts the power output from the engine 150 and outputs the converted power to the ring gear shaft 126 is discussed as the operation under the normal condition of the catalytic converter 175. Possible operations other than the fundamental torque conversion may charge the battery 194 with an excess of electrical energy and discharge the battery 194 to supplement the electrical energy. This is implemented by controlling the output energy from the engine 150, the electrical energy regenerated or consumed by the first motor MG1, and the electrical energy consumed or regenerated by the second motor MG2.

The engine 150 is driven at a possible driving point (that is, the driving point defined by the predetermined torque Terr and the predetermined revolving speed Nerr), irrespective of the effect of the catalytic converter 175. Even when it is determined that the catalytic converter 175 is abnormal at step S306, that is, when the abnormality detection flag F1 is equal to one, this structure accordingly does not worse the emission but protects the environment. Even under the abnormal condition of the catalytic converter 175, the torque corresponding to the torque command value Tr* can be output to the ring gear shaft 126. In case that the energy Pr obtained as the product of the torque command value Tr* and the revolving speed Nr of the ring gear shaft 126 is greater than energy Perr obtained as the product of the predetermined torque Terr and the predetermined revolving speed Nerr, the power output from the engine 150 is insufficient for the required energy. In this state, the insufficiency is supplied by the electrical energy stored in the battery 194. In case that the energy Pr is smaller than the energy Perr, on the contrary, the battery 194 is charged with the excess energy.

Figure 21:
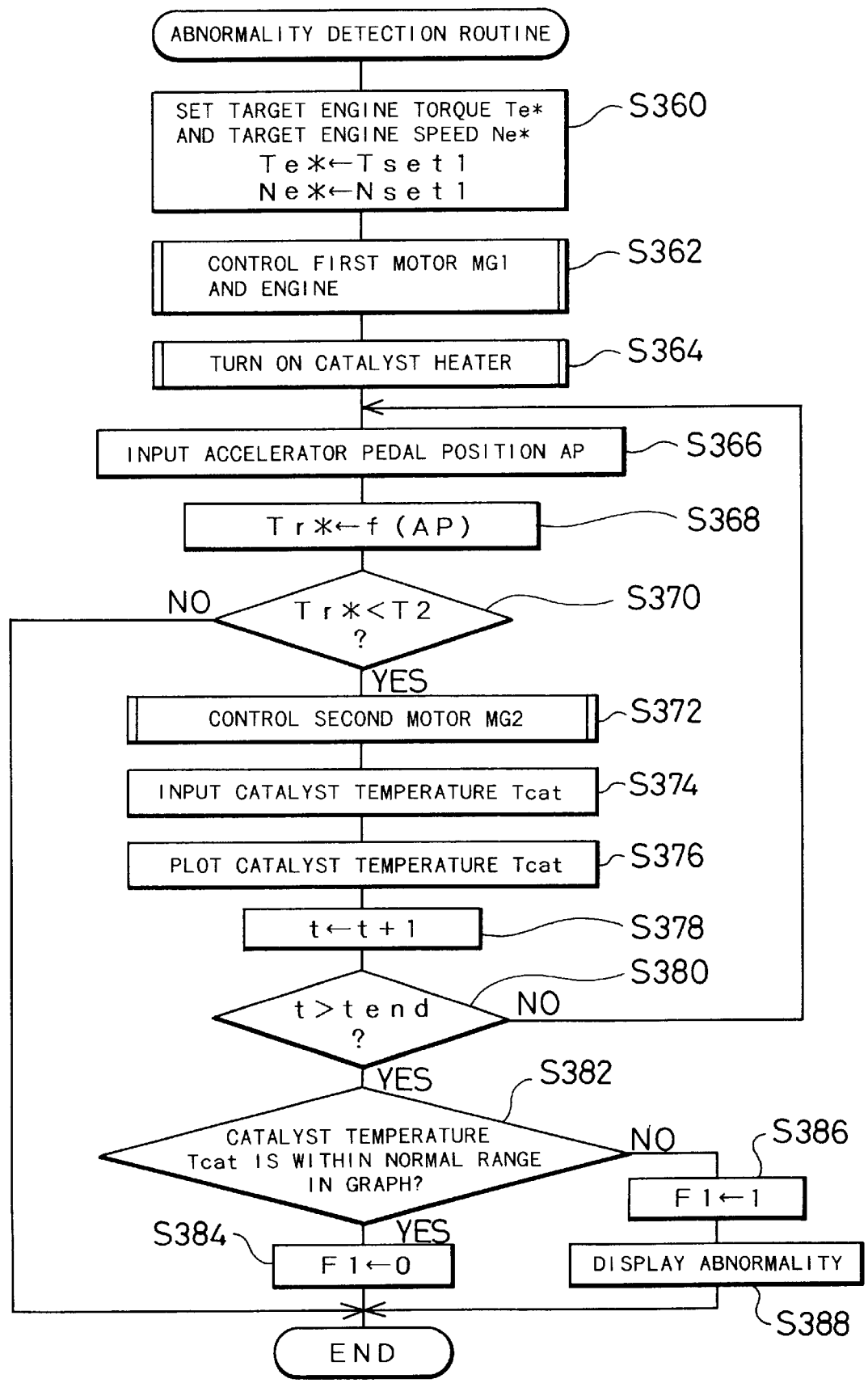
FIG. 21 is a flowchart showing an abnormality detection routine executed by the control CPU 190 of the controller 180 in the second embodiment.

The following describes the operation of checking the three-way catalyst 176 packed in the catalytic converter 175 for deterioration of the catalytic function, based on the abnormality detection routine shown in the flowchart of FIG. 21. This routine is similar to the abnormality detection routine of FIG. 7, except that the control operation of the clutch motor 30 and the engine 50 (step S162 in FIG. 7) is replaced by the control operation of the first motor MG1 and the engine 150 (step S362 in FIG. 21), that the process of comparing the torque command value Td* of the drive shaft 22 based on the input accelerator pedal position AP with the threshold value T1 (steps S166 through S170 in FIG. 7) is replaced by the process of comparing the torque command value Tr* of the ring gear shaft 126 based on the input accelerator pedal position AP with a threshold value T2 (steps S366 through S370 in FIG. 21), and that the control operation of the assist motor 40 (step S172 in FIG. 7) is replaced by the control operation of the second motor MG2 (step S372 in FIG. 21). These differences are ascribed to the structure of the power output system 110 of the second embodiment, which includes the planetary gear 120 and the first motor MG1 in place of the clutch motor 30. The driving condition of the engine 150 and the output state of the torque to the ring gear shaft 126 in the second embodiment are identical with those in the power output system 20 of the first embodiment. The abnormality detection routine of FIG. 21 is accordingly not described in detail. In the second embodiment, the temperature Tcat of the three-way catalyst 176 is plotted in the graph of FIG. 8 through execution of the routine of FIG. 21, for the purpose of checking the three-way catalyst 176 for deterioration of the catalytic function. Like the abnormality detection routine of FIG. 7, the routine of FIG. 21 is carried out when the engine 150 is under a normal driving condition (that is, when the engine 150 and the three-way catalyst 176 are within a normal operating temperature range) and when the torque command value Tr* to be output to the ring gear shaft 126 based on the input accelerator pedal position AP does not exceed the predetermined threshold value T2 after a predetermined time period, for example, 48 hours, has elapsed or the vehicle has run by a predetermined distance, for example, 300 km, since the previous cycle of this routine.

As discussed above, the abnormality detection routine executed by the power output system 110 of the second embodiment enables the engine 150 to be driven under the driving condition suitable for checking the catalytic function of the three-way catalyst 176 (that is, the driving point defined by the predetermined torque Tset1 and the predetermined revolving speed Nset1), during the course of detecting abnormality of the catalytic converter 175, that is, during the course of detecting the deteriorating catalytic function of the three-way catalyst 176. This structure accordingly enables the power output system 110 to realize accurate detection of the deteriorating catalytic function of the three-way catalyst 176. Even during the course of detection, the torque required by the driver can be output to the ring gear shaft 126 by regulating the torque Tm2 of the second motor MG2. In response to a detection of the deteriorating three-way catalyst 176, information regarding the abnormality of the catalytic converter 175 is shown on a display 171. This informs the driver of deterioration of the three-way catalyst 176 without delay. When the driver requires a large torque in the process of detection, the program immediately stops the detection and carries out the processing, for example, the torque control routine of FIG. 18, in order to enable the torque required by the driver to be output to the ring gear shaft 126. The power output system 110 of the second embodiment can freely set the frequency of the check of the three-way catalyst 176 for deterioration of catalytic function; for example, at the time when a predetermined time period has elapsed or the vehicle has run by a predetermined distance since the previous cycle of this routine. This structure effectively prevents the problem of the conventional system, that is, the deteriorating three-way catalyst 176 may be left for a relatively long time.

The power output system 110 of the second embodiment has the planetary gear 120 and the first motor MG1, in place of the clutch motor 30 of the power output system 20 of the first embodiment. The power output system 110 of the second embodiment can work in the same manner as the power output system 20 of the first embodiment by taking into account the gear ratio of the planetary gear 120 in the process of setting the torque command value Tm1* of the first motor MG1 and the torque command value Tm2* of the second motor MG2. The power output system 110 of the second embodiment thus carries out all the processes discussed above as the modifications of the power output system 20 of the first embodiment.

Figure 22:
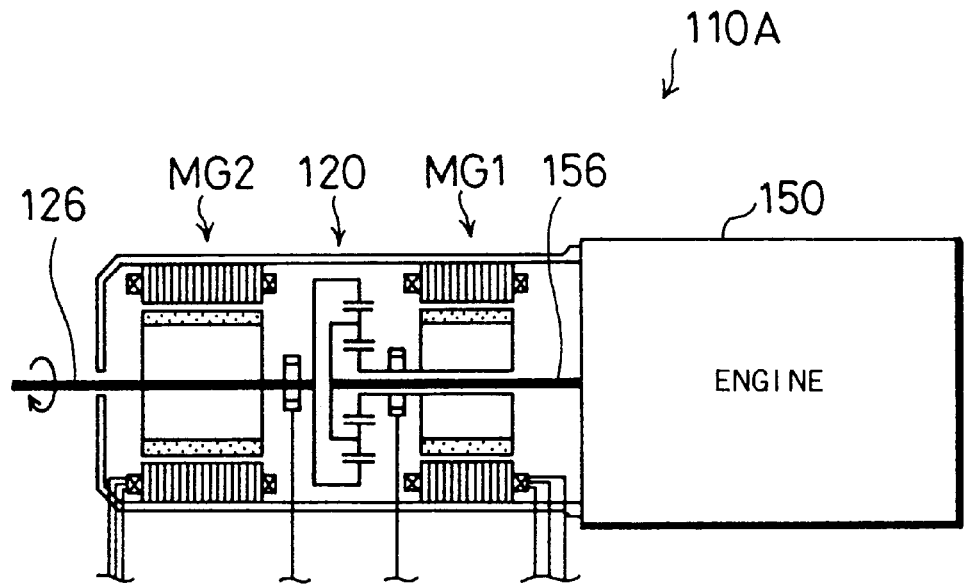
FIG. 22 schematically illustrates structure of another power output system 110A as one modification of the second embodiment.
Figure 23:
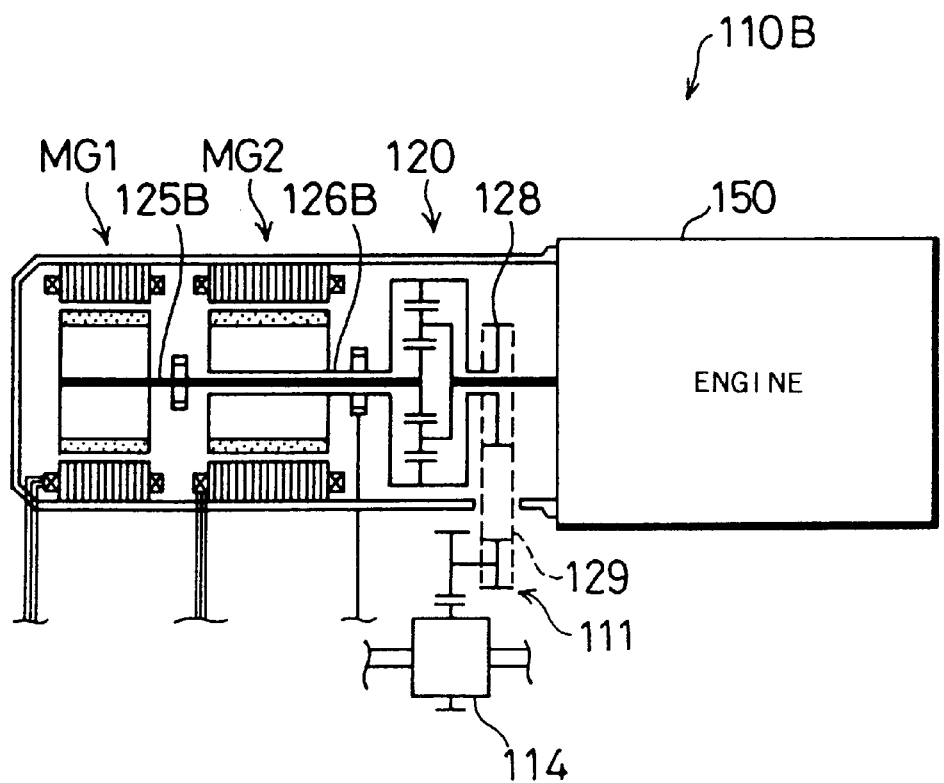
FIG. 23 schematically illustrates structure of still another power output system 110B as another modification of the second embodiment.

In the power output system 110 of the second embodiment, the power output to the ring gear shaft 126 is taken out of the arrangement between the first motor MG1 and the second motor MG2 via the power feed gear 128 linked with the ring gear 122. Like another power output system 110A shown in FIG. 22 as a modified example, however, the power may be taken out of the casing 119, from which the ring gear shaft 126 is extended. FIG. 23 shows still another power output system 10B as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

In the power output system 110 of the second embodiment, the planetary gear 120 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts.

Permanent magnet (PM)-type synchronous motors are used as the clutch motor 30 and the assist motor 40 in the power output system 20 of the first embodiment and the first motor MG1 and the second motor MG2 in the power output system 110 of the second embodiment. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 91 and 92 in the power output system 20 of the first embodiment and the first and the second driving circuits 191 and 192 in the power output system 110 of the second embodiment. Other available examples include IGBT (insulated gate bipolar mode transistor) inverters, thyristor inverters, voltage PWM (pulse width modulation) inverters, square-wave inverters (voltage inverters and current inverters), and resonance inverters.

The batteries 94 and 194 in the power output systems 20 and 110 of the above embodiments may include Pb cells, NiMH cells, Li cells, or the like cells. A capacitor may be used in place of the battery 94 or 194.

The principle of the present invention is applicable to another structure, in which the engine is disconnected from the drive shaft, in addition to the power output systems 20 and 110 of the first and the second embodiments, wherein the torque output from the engine 50 (150) driven at the predetermined driving point is output to the drive shaft 22 (the ring gear shaft 126). One example of such structure is a power output system 210 shown in FIG. 24. The power output system 210 includes an engine EG, a motor MG attached to a drive shaft DS, a generator G for converting the power output from the engine EG to electrical energy, a switch SW for switching between the connection of the engine EG with the drive shaft DS and the connection of the engine EG with the generator G, a battery BT being charged with the electric power generated by the generator G and being discharged to supply the electric power to be consumed by the motor MG, and a vehicle controller CC for controlling operations of the engine EG, the motor MG, and the generator G and the switching operation of the switch SW. In the power output system 210 thus constructed, when the switch SW connects the engine EG with the generator G, the engine EG can be driven freely irrespective of the rotation of the drive shaft DS. In this state, the engine EG can be driven at a driving point suitable for detecting the deteriorating catalytic function of the three-way catalyst. This structure accordingly enables accurate detection of the deteriorating catalytic function of the three-way catalyst. During the detection, the motor MG is controlled to output the torque corresponding to the step-on amount of an accelerator pedal, so that a desired torque is output to the drive shaft DS. In case that deterioration of the three-way catalyst is detected, the switch SW connects the engine EG with the generator G, so as to prevent the emission from being worsened.

The principle of the present invention is also applicable to a modified structure of the power output system 210, in which a crankshaft of the engine EG is always connected to the generator G and disconnected from the drive shaft DS.

In the power output systems 20 and 110 of the first and the second embodiments, the catalytic converters 75 and 175 are selected as the internal combustion engine-related device, and the processes of detecting abnormality of these catalytic converters 75 and 175 are discussed. The technique of such abnormality detection may, however, be applicable to other internal combustion engine-related devices, such as a supercharger and an exhaust gas recirculation (EGR) unit. The following briefly describes a power output system with an abnormality detection apparatus for a supercharger and an exhaust gas recirculation unit.

Figure 25:
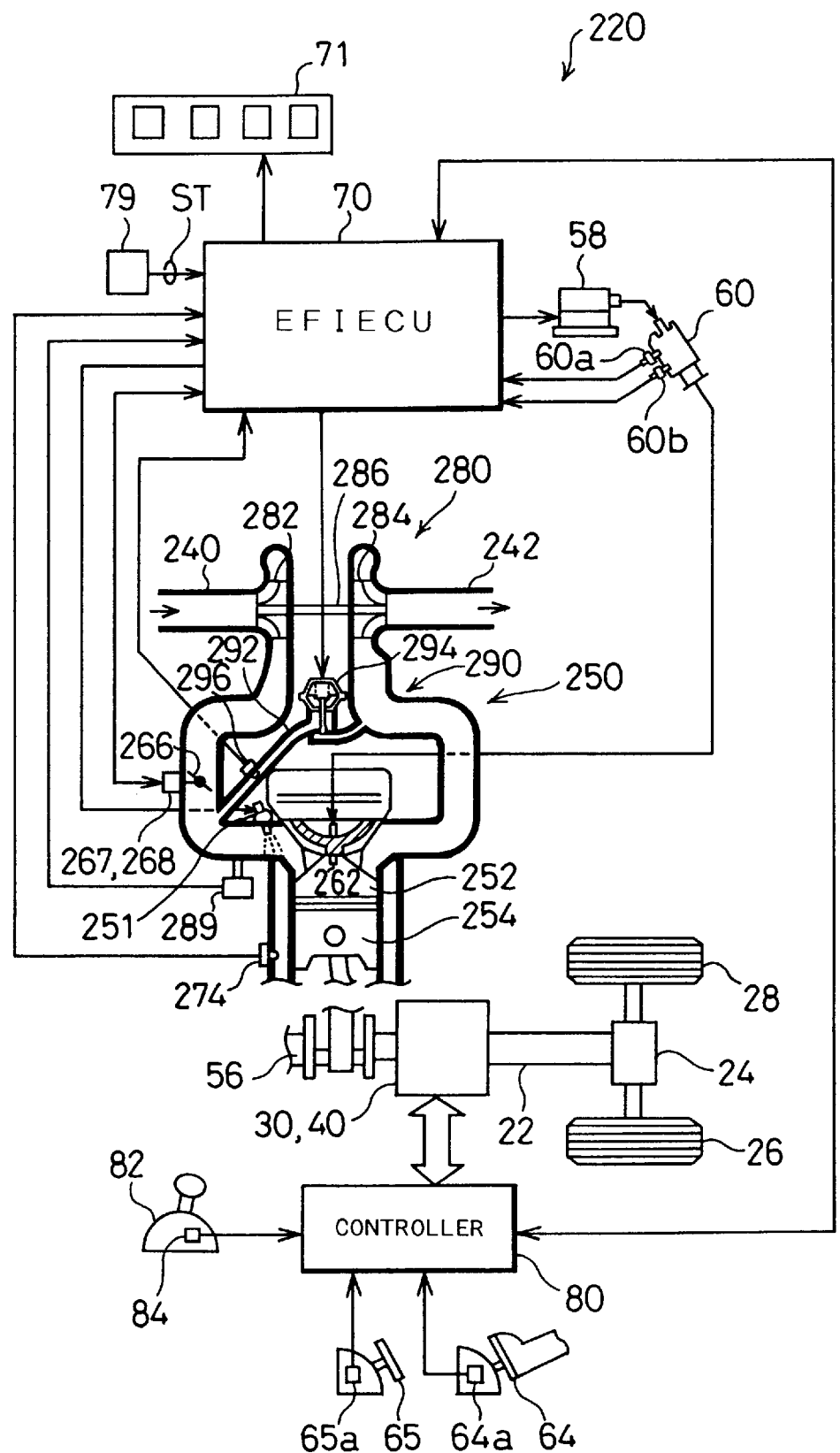
FIG. 25 schematically illustrates structure of a vehicle with a power output system 220 incorporated therein and having an abnormality detection apparatus for detecting abnormality of a supercharger and an exhaust gas recirculation unit.

FIG. 25 schematically illustrates structure of a vehicle with a power output system 220 incorporated therein and having an abnormality detection apparatus for detecting abnormality of a supercharger and an exhaust gas recirculation unit. The power output system 220 has a similar structure to that of the power output system 20 of the first embodiment, except the air intake and exhaust system of an engine 250. The constituents of the power output system 220 that are identical with those of the power output system 20 of the first embodiment are shown by like numerals and not specifically described here. The numerals and symbols used in the description of the power output system 20 of the first embodiment have the same meanings in the description of the power output system 220, unless otherwise specified.

In the power output system 220, a supercharger 280 is attached to an air intake conduit 240 and an air exhaust conduit 242. The supercharger 280 includes a turbine 282 disposed in the air intake conduit 240, a turbine 284 disposed in the air exhaust conduit 242, and a rotating shaft 286 for connecting the turbines 282 and 284 with each other and functioning as the rotating axis of both the turbines 282 and 284. The turbine 282 in the air intake conduit 240 is rotated by the pressure of the gaseous exhaust flowing through the air exhaust conduit 242 via the turbine 284 and the rotating shaft 286, so as to pressurize the intake air supplied to a combustion chamber 252 of the engine 250. A pressure sensor 289 for measuring the pressure in the air intake conduit 240 is arranged after the turbine 282 in the air intake conduit 240.

The downstream side of the turbine 282 in the air intake conduit 240 and the upstream side of the turbine 284 in the air exhaust conduit 242 are connected to each other via an exhaust gas recirculation (EGR) unit 290. The EGR unit 290 includes a circulation pipe 292 for circulating the gaseous exhaust in the air exhaust conduit 242 into the air intake conduit 240 and an on/off valve 294 disposed in the circulation pipe 292. The on/off valve 294 is connected to the EFIECU 70 via a signal line and actuated by the signal output from the EFIECU 70. An EGR temperature sensor 296 for measuring the temperature of the gas in the circulation pipe 292 is disposed in the circulation pipe 292.

Like the engine 50 of the power output sysembodimof the first embodiment, the engine 250 of the power output system 220 has a variety of sensors, such as a throttle valve position sensor 267 for detecting the position of a throttle valve 266 and a water temperature sensor 274 for measuring the temperature of cooling water in the engine 250, as well as an actuator 268 for varying the position of the throttle valve 266.

Like the power output system 20 of the first embodiment, the power output system 220 carries out the torque control routine of FIG. 4. The decision of step S106 with the abnormality detection flag F1 is, however, replaced by the decision with an abnormality detection flag F2 that represents existence or non-existence of abnormality of the supercharger 280 and an abnormality detection flag F3 that represents existence or non-existence of abnormality of the EGR unit 290.

Figure 26:
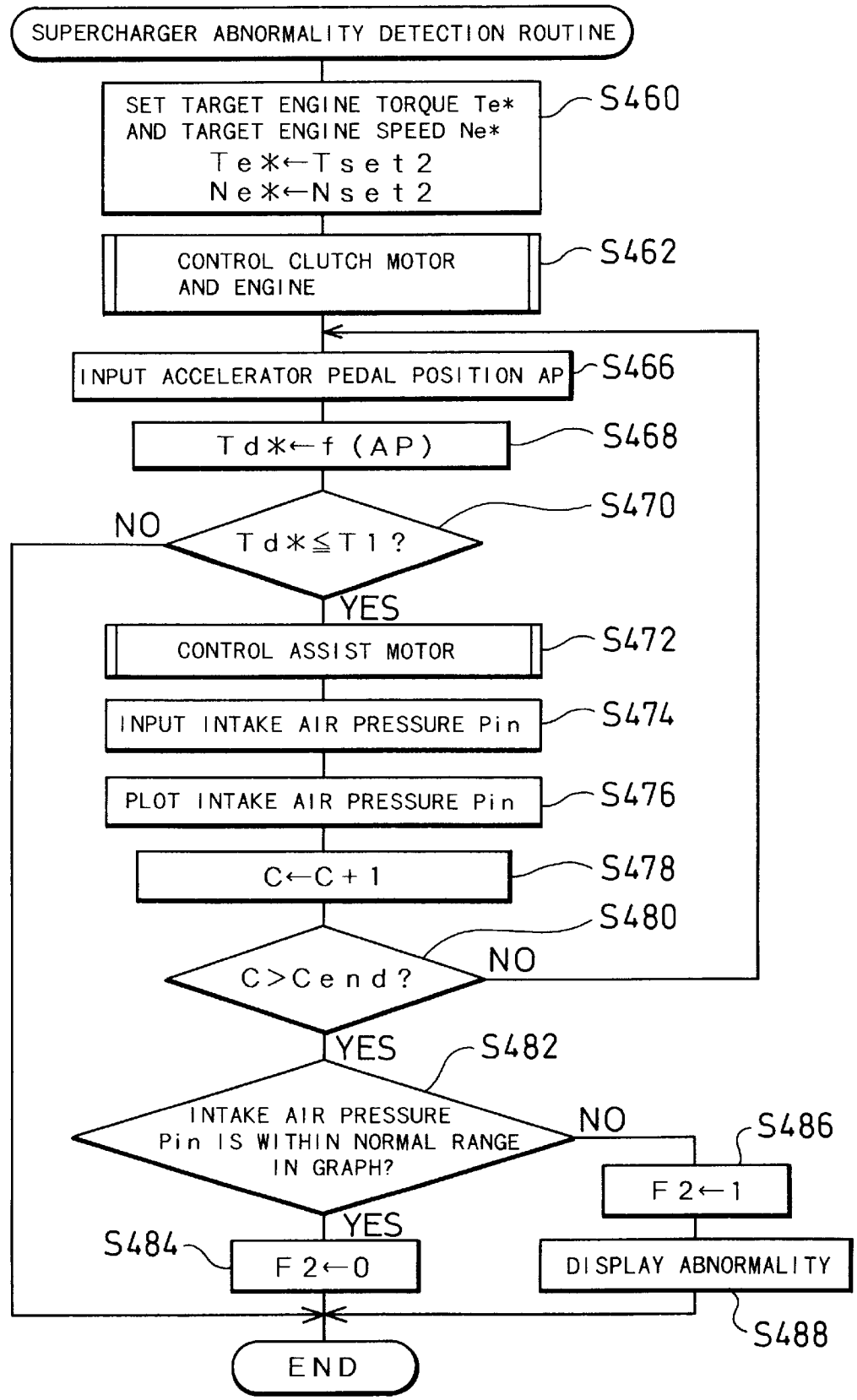
FIG. 26 is a flowchart showing a supercharger abnormality detection routine executed by the controller 80 of the power output system 220.
Figure 27:
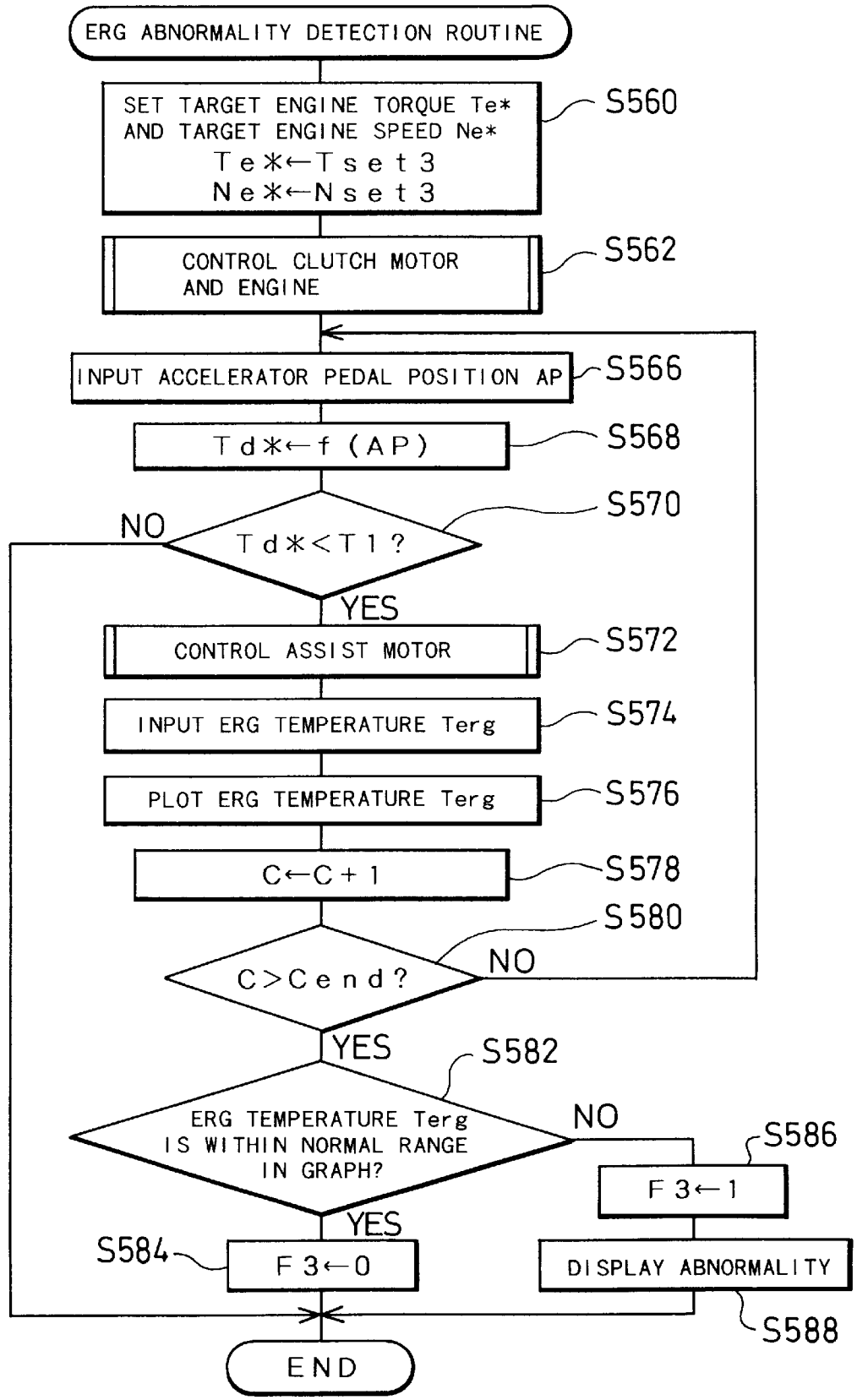
FIG. 27 is a flowchart showing an EGR abnormality detection routine executed by the controller 80 of the power output system 220.

The power output system 220 carries out the abnormality detection of the supercharger 280 based on a supercharger abnormality detection routine shown in the flowchart of FIG. 26 and the abnormality detection of the EGR unit 290 based on an EGR abnormality detection routine shown in the flowchart of FIG. 27. Like the routine of detecting the deteriorating catalytic function of the three-way catalyst 76, these abnormality detection routines are carried out after a predetermined time, for example, 48 hours, has elapsed or the vehicle has run by a predetermined distance, for example, 300 km, since the previous cycle of the routines.

When the program enters the supercharger abnormality detection routine of FIG. 26, the control CPU 90 of the controller 80 first sets a predetermined torque Tset2 and a predetermined revolving speed Nset2 to the target torque Te* and the target revolving speed Ne* of the engine 250 at step S460. The torque Tset2 and the revolving speed Nset2 define a specific driving point of the engine 250, at which the supercharger 280 sufficiently functions. The program then controls the clutch motor 30 and the engine 250, in order to enable the engine 250 to be driven at the preset driving point at step S462. The control CPU 90 then determines the torque command value Td* corresponding to the input accelerator pedal position AP at steps S466 and S468, and compares the torque command value Td* with a predetermined threshold value T1 at step S470.

In case that the torque command value Td* is not greater than the threshold value T1, the program controls the assist motor 40 at step S472, reads an intake air pressure Pin measured by the pressure sensor 289 attached to the air intake conduit 240 at step S474, and plots the input intake air pressure Pin in a graph at step S476. Although the graph, in which the intake air pressure Pin is plotted, is not illustrated, the graph shows a variation in intake air pressure Pin against the counter C, like the graph of FIG. 8 showing the plot of the temperature Tcat of the three-way catalyst 76 against the counter C.

Like the abnormality detection routine of FIG. 7, the program repeats the processing of steps S466 through S480 to plot the observed intake air pressure Pin until the counter C exceeds a terminal value Cend. When the counter C exceeds the terminal value Cend, the program refers to the plot of the intake air pressure Pin and determines whether or not the variation in intake air pressure Pin is within a normal range at step S482. When the variation is within the normal range, the abnormality detection flag F2 is set equal to zero at step S484. When the variation is out of the normal range, on the contrary, the abnormality detection flag F2 is set equal to one at step S486, and existence of abnormality of the supercharger 280 is shown on the display 71 at step S488. In this example, the technique of the first embodiment is applied to detect abnormality of the supercharger 280. Namely the technique specifies a normal range of the intake air pressure Pin in the graph when the engine 250 is driven at the preset driving point, and determines whether or not the plot of the intake air pressure Pin exists within the normal range.

As discussed above, the supercharger abnormality detection routine executed by the power output system 220 enables the engine 250 to be driven under the driving condition suitable for detecting abnormality of the supercharger 280, during the course of detection. This structure accordingly enables the power output system 220 to realize accurate detection of abnormality of the supercharger 280. Even during the course of detection, the torque required by the driver can be output to the drive shaft 22 by regulating the torque Ta of the assist motor 40. In response to a detection of abnormality, information regarding the abnormality of the supercharger 280 is shown on the display 71. This informs the driver of abnormality of the supercharger 280 without delay. When the driver requires a large torque in the process of detection, the program immediately stops the detection and outputs the torque required by the driver to the drive shaft 22.

The EGR abnormality detection routine of FIG. 27 is similar to the abnormality detection routine of FIG. 7 and the supercharger abnormality detection routine of FIG. 26, except some modifications depending upon the object of abnormality detection. These modifications include that the target torque Te* and the target revolving speed Ne* of the engine 250 are set to a driving point, at which the EGR unit 290 sufficiently functions, that an EGR temperature Pegr measured by the EGR temperature sensor 296 disposed in the circulation pipe 292 is plotted, and that the plot of the EGR temperature Pegr is used for detection of abnormality of the EGR unit 290. The routine of FIG. 27 is thus not described in detail. The EGR abnormality detection routine realizes accurate detection of abnormality of the EGR unit 290 and allows the torque required by the driver to be output to the drive shaft 22 even during the course of detection.

The power output system 220 continuously measures the intake air pressure Pin and the EGR temperature Pegr for a predetermined time period and plots the observed data in the graph while the engine 250 is driven at the preset driving point, and determines whether or not the plots of the intake air pressure Pin and the EGR temperature Pegr are within the respective normal ranges, thereby detecting abnormality of the supercharger 280 and the EGR unit 290. One modified structure determines whether or not the intake air pressure Pin and the EGR temperature Pegr become equal to or greater than the respective predetermined values within a fixed time period after the engine 250 has fallen into a preset driving condition, thereby detecting abnormality of the supercharger 280 and the EGR unit 290. Another modified structure plots the intake air pressure Pin and the EGR temperature Pegr while the engine 250 is driven according to a predetermined driving pattern, and determines whether or not the plots of the intake air pressure Pin and the EGR temperature Pegr are within the respective normal ranges, thereby detecting abnormality of the supercharger 280 and the EGR unit 290.

Figure 24:
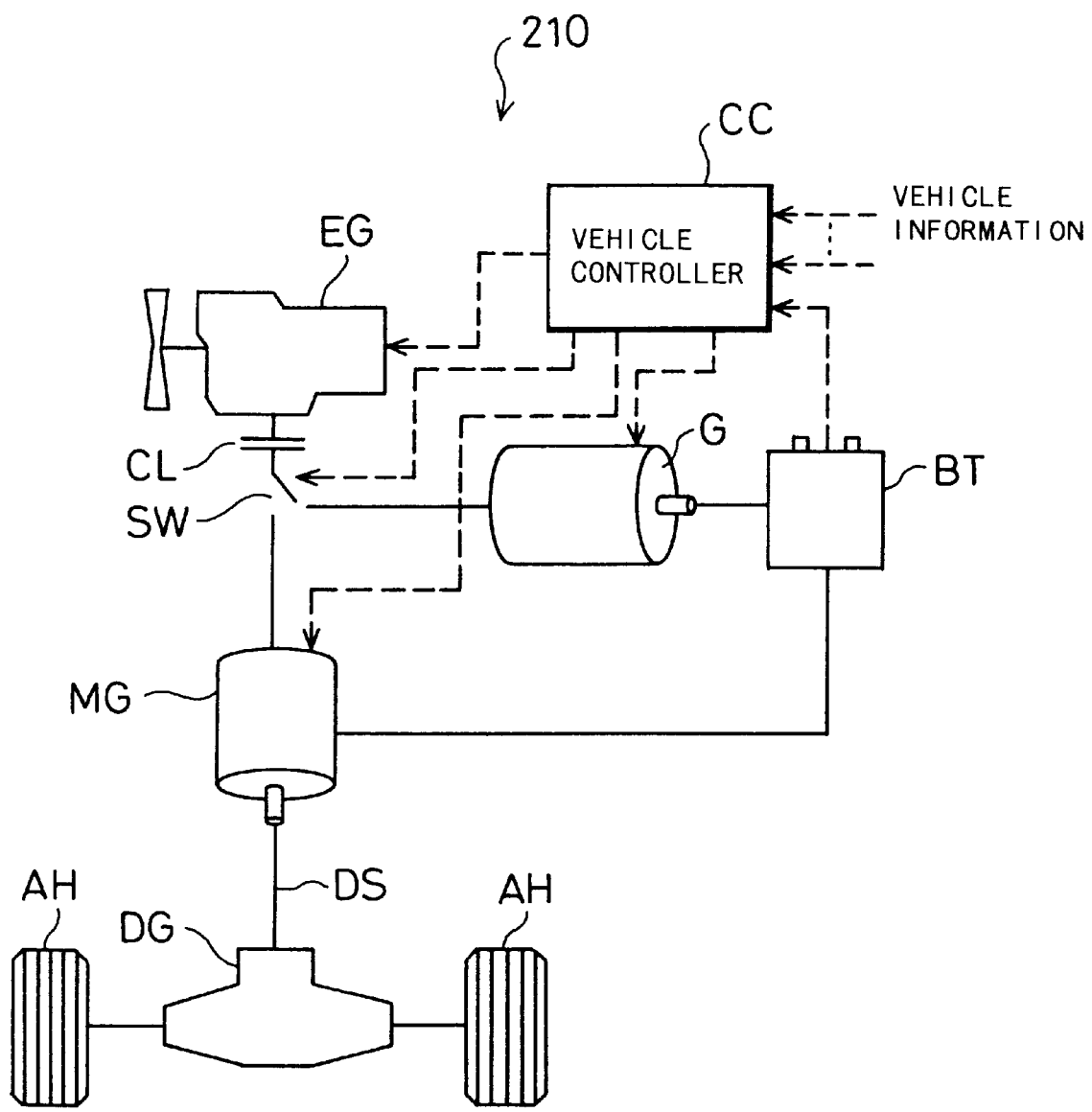
FIG. 24 shows one exemplified structure, to which the principle of the present invention is applicable.

These abnormality detection processes of the supercharger 280 and the EGR unit 290 are also applicable to the structure of the power output system 110 of the second embodiment with the engine 250 in place of the engine 150, the structure of the power output system 210 of FIG. 24 with the engine 250 in place of the engine EG, and the power output system, wherein the crankshaft of the engine EG is always connected to the generator G and disconnected from the drive shaft DS, with the engine 250 in place of the engine EG, in addition to the structure of the power output system 20 of the first embodiment with the engine 250 in place of the engine 50 (power output system 220).

The present invention is not restricted to the above embodiments or their modified examples, but there may be many modifications, changes, and alterations without departing from the scope or spirit of the main characteristics of the present invention. The principle of the present invention is applicable to any abnormality detection apparatus for an internal combustion engine-related device, which enables the internal combustion engine to be driven under a driving condition suitable for detecting the abnormality or the current state of the internal combustion engine-related device, and to any power output system with such an apparatus.

By way of example, the present invention is applicable to apparatuses for detecting abnormality of idle driving means that enables the internal combustion engine to be driven at an idle engine speed and intake and exhaust timing regulation means for regulating the timings of air intake and exhaust of the internal combustion engine. The present invention is also applicable to any power output systems mounted on a variety of transportation means including ships and airplanes as well as a variety of industrial machines.

It should be clearly understood that the above embodiments are only illustrative and not restrictive in any sense. The scope and spirit of the present invention are limited only by the terms of the appended

What is claimed is:

1. An abnormality detection apparatus for detecting abnormality of an internal combustion engine-related device, whose state is varied by a driving condition of an internal combustion engine, said abnormality detection apparatus comprising:
   physical quantity measurement means for measuring a physical quantity that reflects a state of said internal combustion engine-related device;
   engine operation control means for controlling operation of said internal combustion engine to a predetermined driving condition, in response to a predetermined instruction; and
   abnormality detection means for detecting abnormality of said internal combustion engine-related device based on said physical quantity, when said engine operation control means causes said internal combustion engine to be driven under said predetermined driving condition.

2. An abnormality detection apparatus in accordance with claim 1, wherein said internal combustion engine-related device is converter means having a catalyst for converting a gaseous exhaust discharged from said internal combustion engine, and
   said physical quantity measurement means comprises means for measuring temperature of said catalyst.

3. An abnormality detection apparatus in accordance with claim 1, wherein said internal combustion engine-related device is converter means having a catalyst for converting a gaseous exhaust discharged from said internal combustion engine, and
   said physical quantity measurement means comprises means for measuring an amount of oxygen included in the gaseous exhaust converted by said converter means.

4. An abnormality detection apparatus in accordance with claim 1, wherein said internal combustion engine-related device is supercharger means for pressurizing the air and supplying the pressurized air to said internal combustion engine, and
   said physical quantity measurement means comprises means for measuring pressure in an air intake conduit in said internal combustion engine.

5. An abnormality detection apparatus in accordance with claim 1, wherein said internal combustion engine-related device is exhaust gas recirculation means for circulating part of a gaseous exhaust discharged from said internal combustion engine into an air intake conduit of said internal combustion engine at a predetermined timing, and
   said physical quantity measurement means comprises means for measuring temperature in a circulation pipe of said exhaust gas recirculation means, which enables circulation of the gaseous exhaust into said air intake conduit.

6. An abnormality detection apparatus in accordance with claim 1, said abnormality detection apparatus further comprising:
   abnormality display means for, when said abnormality detection means detects abnormality of said internal combustion engine-related device, displaying the detected abnormality.

7. A power output system for utilizing energy taken out of an internal combustion engine and outputting power to a drive shaft, said power output system comprising:
   said internal combustion engine;
   an internal combustion engine-related device, whose state is varied by a driving condition of said internal combustion engine;
   a motor connecting with said drive shaft, whereby power is transmitted between said motor and said drive shaft;
   electric power supply means for supplying electric power required for the transmission of the power by said motor;
   physical quantity measurement means for measuring a physical quantity that reflects the state of said internal combustion engine-related device;
   engine operation control means for controlling operation of said internal combustion engine to a predetermined driving condition, in response to a predetermined instruction; and
   abnormality detection means for detecting abnormality of said internal combustion engine-related device based on the physical quantity measured by said physical quantity measurement means, when said engine operation control means causes said internal combustion engine to be driven under the predetermined driving condition.

8. A power output system in accordance with claim 7, wherein said internal combustion engine-related device is converter means having a catalyst for converting a gaseous exhaust discharged from said internal combustion engine, and said physical quantity measurement means comprises means for measuring temperature of said catalyst.

9. A power output system in accordance with claim 7, wherein said internal combustion engine-related device is converter means having a catalyst for converting a gaseous exhaust discharged from said internal combustion engine, and said physical quantity measurement means comprises means for measuring an amount of oxygen included in the gaseous exhaust converted by said converter means.

10. A power output system in accordance with claim 7, wherein said internal combustion engine-related device is supercharger means for pressurizing the air and supplying the pressurized air to said internal combustion engine, and said physical quantity measurement means comprises means for measuring pressure in an air intake conduit in said internal combustion engine.

11. A power output system in accordance with claim 7, wherein said internal combustion engine-related device is exhaust gas recirculation means for circulating part of a gaseous exhaust discharged from said internal combustion engine into an air intake conduit of said internal combustion engine at a predetermined timing, and said physical quantity measurement means comprises means for measuring temperature in a circulation pipe of said exhaust gas recirculation means, which enables circulation of the gaseous exhaust into said air intake conduit.

12. A power output system in accordance with claim 7, said power output system further comprising:

motor control means for controlling said motor to output a required power to said drive shaft in response to said predetermined instruction.

13. A power output system in accordance with claim 12, wherein said internal combustion engine is mechanically linked with said drive shaft, said motor control means comprises means for controlling said motor to output a power difference between a power output from said internal combustion engine controlled by said engine operation control means and the required power.

14. A power output system in accordance with claim 7, wherein said engine operation control means comprises means for, when a required power to be output to said drive shaft is not less than a predetermined level, prohibiting the control of said internal combustion engine to said predetermined driving condition,irrespective of said predetermined instruction.

15. A power output system in accordance with claim 7, wherein said engine operation control means comprises means for stopping the control of said internal combustion engine to said predetermined driving condition, when a required power to be output to said drive shaft is varied to be not less than a predetermined level during the course of the control of said internal combustion engine.

16. A power output system in accordance with claim 7, said power output system further comprising:

engine control means for, when said abnormality detection means detects abnormality of said internal combustion engine-related device, controlling said internal combustion engine to a predetermined second driving condition, which is different from said predetermined driving condition.

17. A power output system in accordance with claim 16, said motor control means is a first motor control means, and said power output system further comprising:

second motor control means for, when said engine control means controls said internal combustion engine to said predetermined second driving condition, controlling said motor to output a required power to said drive shaft.

18. A power output system in accordance with claim 7, said power output system further comprising:

a pair-rotor motor comprising a first rotor connecting with an output shaft of said internal combustion engine and a second rotor connecting with said drive shaft, said second rotor being rotatable relative to said first rotor, said first and second rotors being electromagnetically connected with each other, whereby power is transmitted between said output shaft of said internal combustion engine and said drive shaft via an electromagnetic coupling of said first rotor with said second rotor.

19. A power output system in accordance with claim 18, wherein said motor comprises said second rotor of said pair-rotor motor and a stator that rotates said second rotor.

20. A power output system in accordance with claim 7, said power output system further comprising:

three shaft-type power input/output means having three shafts, said three shaft-type power input/output means inputting and outputting power to and from a residual one shaft, based on predetermined powers input to and output from any two shafts among said three shafts, wherein an output shaft of said internal combustion engine and said drive shaft are linked with any two of said three shafts.

\* \* \* \* \*